US007624265B1

(12) United States Patent
Slyva et al.

(10) Patent No.: US 7,624,265 B1
(45) Date of Patent: Nov. 24, 2009

(54) METHODS AND APPARATUS FOR ESTABLISHING COMMUNICATIONS WITH A DATA STORAGE SYSTEM

(75) Inventors: William D. Slyva, Holliston, MA (US); Gerard T. Carraher, Holliston, MA (US); Tuan Q. An, Boston, MA (US); Jeff Emerson, Marston Mills, MA (US); Timothy F. McCain, Hopkinton, MA (US); Neil J. Thibodeau, Sutton, MA (US); Kristen D. Martin, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1200 days.

(21) Appl. No.: 10/036,333

(22) Filed: Dec. 24, 2001

Related U.S. Application Data

(60) Provisional application No. 60/268,778, filed on Feb. 14, 2001.

(51) Int. Cl.
*H04L 9/32* (2006.01)
*G06F 15/173* (2006.01)
*G06F 15/16* (2006.01)

(52) U.S. Cl. .......................................... 713/168; 726/3
(58) Field of Classification Search ................... None
See application file for complete search history.

(56) References Cited

U.S. PATENT DOCUMENTS

| | | | | |
|---|---|---|---|---|
| 5,555,371 A | * | 9/1996 | Duyanovich et al. ......... | 714/13 |
| 5,742,762 A | * | 4/1998 | Scholl et al. ................ | 709/200 |
| 6,023,507 A | * | 2/2000 | Wookey ...................... | 709/224 |
| 6,061,794 A | * | 5/2000 | Angelo et al. ................. | 726/3 |
| 6,070,192 A | * | 5/2000 | Holt et al. ................... | 709/227 |
| 6,154,465 A | * | 11/2000 | Pickett ...................... | 370/466 |
| 6,230,240 B1 | * | 5/2001 | Shrader et al. .............. | 711/114 |
| 6,269,382 B1 | * | 7/2001 | Cabrera et al. .............. | 707/204 |
| 6,487,635 B1 | * | 11/2002 | Cohen et al. ................ | 711/112 |
| 6,859,882 B2 | * | 2/2005 | Fung .......................... | 713/300 |
| 7,024,692 B1 | * | 4/2006 | Schanze et al. .............. | 726/10 |

\* cited by examiner

*Primary Examiner*—Gilberto Barron, Jr.
*Assistant Examiner*—Virgil Herring
(74) *Attorney, Agent, or Firm*—Chapin IP Law, LLC

(57) ABSTRACT

Mechanisms and techniques allow for the establishment of secure, authenticated packet-based communications sessions between a computer system and a processor, such as a service processor, within a data storage system. The computer system is configured with a connection process connection process that operates under user control and that can establish a first packet communications session to a data communications device such as a router within a first computer network such as a vendor computer network. The connection process connection process can then cause the data communications device to establish a second packet communications session between the data communications device and the processor within the data storage system in a secure, reliable and authenticated manner. Using a unique handshaking technique, the connection process connection process in the computer system, the data communications device, and a service process operating in a service processor on the data storage system can negotiate the establishment of the packet communications sessions to allow applications in these components of to make use of standardized communications techniques such as TCP/IP.

30 Claims, 9 Drawing Sheets

US 7,624,265 B1

METHODS AND APPARATUS FOR ESTABLISHING COMMUNICATIONS WITH A DATA STORAGE SYSTEM

CLAIM TO BENEFIT OF FILING DATE OF EARLIER FILED PROVISIONAL PATENT APPLICATION

This application claims the benefit of the filing date of U.S. Provisional Application Ser. No. 60/268,778, filed Feb. 14, 2001 and entitled "METHODS AND APPARATUS FOR ESTABLISHING COMMUNICATIONS WITH A DATA STORAGE SYSTEM," the teachings of which are hereby incorporated by reference in their entirety.

FIELD OF THE INVENTION

The present invention generally relates to systems for connecting to a data storage system, and more particularly, to systems and techniques which allow a computer system to establish remote management access to a data storage system over a computer network.

BACKGROUND OF THE INVENTION

The rapid expansion and use of computer networks such as the Internet by consumers, corporations and other institutions has resulted in the generation of large amounts of data and information that must be stored. To solve this storage need, data storage system developers have engineered and produced high-capacity data storage systems that can be coupled, for instance, to a corporate local area computer network (LAN) in order to store information and data generated and managed by computer systems on such a network. The LAN network may be coupled to one or more larger wide area networks (WAN) which form or connect with part of the Internet. The server computer systems on the LAN can operate to provide access to data in the data storage systems by receiving and servicing data access requests sent from computer systems (e.g., clients) on the local or worldwide (e.g., Internet) network. As a result, the data storage systems can share the data or other information that they store and maintain in a worldwide manner.

A typical high-capacity data storage system includes a plurality of data storage devices such as disk drives which collectively operate under the control of one or more software driven microprocessors to access (e.g., store or retrieve data) data in accordance with data access requests (e.g., input-output read or write requests). A computer system such as a server can transmit the data access requests to the data storage system over one or more high-speed data interfaces that couple the computer system to the data storage system. The high-speed data interfaces may be, for example, small computer system interfaces (e.g., SCSI, Ultra-SCSI, or the like), Fibre-Channel interfaces, ESCON interfaces, or the like. The data storage system may also include a shared memory system and an arrangement of one or more data buses that interconnect the data interfaces, microprocessors and data storage devices.

Due to the overall complexity of large capacity data storage systems, such data storage systems frequently include a service processor which is responsible for providing access on behalf of data storage system service technicians to the various components within the data storage system. As an example, a large capacity data storage system such as one of the Symmetrix models of data storage systems manufactured by EMC Corp. of Hopkinton, Mass., U.S.A., includes a service processor as one of its components. The service processor is highly integrated into the design of the data storage system and operates software programs that allow access, by a service technician, to the status, operations, and functionality of the components that make up the data storage system.

By way of example, using the service processor, a service technician can load a new version of a microprocessor control program into the data storage system to allow the data storage system to operate using the most up-to-date data release of the control program. A service technician can also use the service processor to examine the status of components within the data storage system in the event of a component failure. The service processor generally provides an interface to allow access to data storage system data structures, trace data, and/or other system or component information maintained by components within the data storage system. The service processor is not used as an interface to read and write the large volumes of storage data that the data storage system maintains on behalf of computer systems. Instead, the service processor provides a service, maintenance and failure diagnosis interface into the data storage system which is used by service technicians for problem diagnosis, proactive and preventative data storage system maintenance, and upgrades (e.g., replacement of software control programs).

Generally, there are two ways in which a service technician can access the service processor functionality within a data storage system: local access or remote access. Using the local access technique, a service technician can use a keyboard and display (e.g., a computer monitor) which are built-in to the data storage system to access data and perform service processor functionality while being physically present in the facility (e.g., a corporate computing system facility) that operates the data storage system. Using the remote access technique, a service technician can operate a service software program on a service workstation that is remotely located from the data storage system facility to remotely access service processor functionality. In the remote access technique, the service processor includes modem functionality that allows the service software program operating in the service workstation to "dial-in" to the service processor using a proprietary communications protocol. The service software program operating in the service workstation provides a graphical user interface (GUI) for the service technician to send data storage system administration commands to the data storage system using the proprietary communications protocol over the dial-in connection. The service technician can thus remotely operate the service processor and its associated functionality.

In some conventional implementations, the service processor can also perform one or more data storage system diagnostic programs which can provide around the clock monitoring of the operation of the data storage system. When a data storage system diagnostic program detects a problem in the operation of the data storage system, such as a failed component (e.g., failed disk drive, power supply or the like) the diagnostic program can automatically cause the service processor to use the modem functionality to place an outgoing service call (e.g., a "call home") to a service workstation located, for example, in a remote service facility provided by a vendor of the data storage system. The service processor can use the call home connection from the service processor to the service facility to send a service ticket to the service facility indicating the nature of the problem encountered by the diagnostic program within the data storage system. A service technician located at the vendor service facility that reviews the service ticket can then use the remote service processor access technique outlined above to dial-in to the service processor control program using the proprietary service processor communications protocol in an attempt to remotely administer, further diagnose, and possibly correct the problem within the data storage system as identified by the service ticket.

SUMMARY OF THE INVENTION

There are a variety of shortcomings related to the aforementioned conventional techniques of remotely accessing service processor functionality within a data storage system. Such problems largely stem from the fact that the conventional connection establishment techniques used to remotely access the service processor rely on highly proprietary and non-standard communications protocols and connection techniques. For example, EMC Corporation provides a proprietary communications service software program called "Symmcomm," which allows a service technician operating a service workstation on the vendor network to remotely initiate a proprietary dial-up communications session to a service processor operating within a Symmetrix data storage system on a customer computer network. The Symmcomm program establishes a direct dial connection from the service workstation computer system to the modem functionality operating within the service processor in the Symmetrix data storage system. This direct dial connection operates a proprietary communications protocol and the phone call is placed regardless of the geographic locations of the service workstation and the data storage system to which the connection is placed. For instance, if the service workstation is located at an EMC service facility in Hopkinton, Mass., U.S.A. and the Symmetrix data storage system to which the proprietary direct dial connection is placed is located somewhere in South America, the direct dial connection is placed using a phone connection in Hopkinton to a phone number serviced by phone company in South America. Such connections can be unreliable at times resulting in errors in data transmission between the service workstation and the data storage system.

Once the proprietary dial-up connection is established, the service technician at the service workstation can use proprietary graphical user interface programs such as "SymmWin" and "SymmRemote" (each manufactured by EMC Corporation) to remotely interact with the service processor within the data storage system located anywhere in the world. However, due to security concerns, the SymmWinn and SymmRemote programs require intimate knowledge of the underlying proprietary communications techniques used to communicate over the dial-up connection between a service workstation and the service processor within the data storage system. Stated differently, conventional service processor communications software is only able to communicate with other service software programs that provide the ability to communicate using the proprietary communications techniques required by the service processor. This is because remote administration of a data storage system involves providing a highly secure communications connection between the service workstation the service processor in the data storage system.

This limits the ability, for example, for a third party software vendor to create a software application that can easily access service processor functionality in a remote manner. As a specific example, if a customer purchases a data storage system and desires to write a custom software application that operates on the service processor to periodically access status information concerning available storage space within the data storage system, it may be difficult for that customer to obtain access to the proprietary communications techniques that the service processor requires in order to support the remote connection capability with the custom software application. In other words, since the connectivity to the service processor within the data storage system is not standard, it becomes difficult for applications other than the vendor-provided remote administration applications (e.g., EMC's SymmComm, SymmWin, and SymmRemote) to communicate with the service processor in a data storage system.

Embodiments of the present invention significantly overcome such limitations by providing the ability to use standard communications techniques such as the establishment of packet-based Transmission Control Protocol/Internet Protocol (TCP/IP) communications sessions between a service processor within a data storage system and a remotely operating computer system. According to this invention, a service processor in a data storage system is any type of network-attached computer processing device that operates as a service processor or front-end device in, or on (i.e., attached to), a data storage system. A service processor may be a laptop computer system or a card or board integrated into the data storage system to allow technicians to perform maintenance and service operations, or the service processor may be a microprocessor and associated circuitry (e.g., motherboard, memory system, card, interface, etc.) embedded within a housing that contains other components within the data storage system.

The packet communications session(s) established according to embodiments of the invention between a computer system and service processor in a data storage system are secure and reliable and provide for strict authorization and authentication of users and/or processes attempting to establish such connections. Moreover, since the techniques explained herein for establishing communications sessions between a computer system and a service processor in a data storage system preferably operate using a connectionless protocol such as the Internet Protocol (IP), if a modem connection is required to support a portion of the IP communications session (e.g., a portion of the connection that couples to the service processor), the modem connection can be established locally to the data storage system which allows for a more reliable modem connection (e.g., versus a multi-continent long distance connection) as well as lower connection costs (e.g., lower long distance charges). The remainder of the connection can take place, for example, over the Internet allowing high-speed and toll-free communications.

More specifically, the present invention provides mechanisms and techniques that operate in a computer system to establish a packet communications sessions to a data storage system. A computer system configured according to such embodiments may be any type of general purpose computerized device, such as a desktop or laptop personal computer, workstation, or the like (which typically include such components as one or more processors, a memory system, input/output device(s), communications interface(s)) or may be a dedicated computerized device specifically configured to operate according to the methods and techniques explained herein. In particular, certain method embodiments of the invention operate in such a computer system and relate to establishing a packet communications sessions to a data storage system. One such method comprises the steps of receiving a request to establish a communications session with a data storage system. The request might be, for example, a support engineer operating a connection process (e.g., a support application) in the computer system within a vendor computer network to begin the process of connecting to a service processor in the data storage system to perform a remote maintenance or service operation to the data storage system. The method establishes a first packet communications session, such as an Internet Protocol connection, from the computer system to a data communications device capable of communicating with the data storage system. The data communications device might be, for example, a router within the vendor network that is capable of accessing (e.g., over the Internet), a customer network containing the data storage system within a customer facility. The method establishes a second packet communications session from the data communications device to a service processor within the data storage system (e.g., from the vendor network, through the Internet and the customer network, into the service processor in the data storage system). The method then performs packet communications between with the computer system and data storage system using the first and second packet communications sessions.

Since conventional data storage system service processor access techniques do not support secure, authenticated and authorized packet communications sessions such as the Internet Protocol sessions provided by embodiments of this invention, conventional systems are limited in their ability to offer a wide variety of applications that can access a data storage system.

In another embodiment, the step of receiving a request to establish a communications session with a data storage system comprises the steps of receiving user authentication information for a user of the computer system and authenticating an identity of the user based on the user authentication information. The user authentication information can be, for example, a user name and password of a user operating the computer system. The receiving step also receives a data storage system identity indicating an identity of the data storage system to which the packet communications session is to be established. This can be done in a number of ways.

For example, in another embodiment, the step of receiving data storage system identity information comprises the steps of receiving data storage system search criteria and providing data storage system search criteria to a connection monitor computer system to produce a set of data storage system identities that meet the data storage system search criteria. The method then receives the set of data storage system identities that meet the data storage system search criteria and allows the user to select (e.g., via a graphical user interface, menu, prompt, or the like) at least one data storage system identity from the set of data storage system systems.

In one embodiment, the data storage system search criteria is received from at least one of i) a user of the computer system (e.g., via prompting as noted above) and/or ii) a service ticket identifying a data storage system. The data storage system search criteria also includes at least a portion of the user authentication information. The set of data storage system identities that meet the data storage system search criteria includes identities of data storage systems to which a user identified by the portion of the user authentication information is allowed to establish a packet communications session.

In yet another embodiment, the step of receiving a request to initiate a communications session with the data storage system further comprises the steps of receiving a service ticket from the data storage system and analyzing the service ticket to determine an identity of the data storage system to which a packet communications session is to be established from the computer system. This automates the process of receiving the request.

A connection monitor computer system within the vendor network can produce the set of data storage system identities for selection of one data storage system by the user. Based on this selection, the request to establish a communications session with a data storage system is formulated.

In one embodiment, the request to establish a communications session with a data storage system includes the identity of the data storage system to which a communications session is to be established (i.e., as part of the request). The identity specifies at least one of i) a phone number of a service processor modem associated with the data storage system, ii) a serial number of the data storage system, and iii) customer information related to a customer operating the data storage system.

According to another embodiment of the invention, the step of establishing a first packet communications session from the computer system to a data communications device capable of communicating with the data storage system comprises the steps of obtaining connection information for a data communications device that is capable of communicating with the data storage system and initiating the first packet communications session from the computer system to a data communications device using the connection information for the data communications device. The method provides, to the data communications device, first packet communications session authentication information such that the data communications device can determine if a user of the computer system is authorized to establish the first packet communications session. If the user of the computer system is authorized to establish the first packet communications session, the method allows the computer system to perform the step of establishing a second packet communications session from the data communications device to the data storage system. However, if the user of the computer system is not authorized to establish the first packet communications session, the method denies the ability of the computer system to perform the step of establishing a second packet communications session from the data communications device to the data storage system. In this manner, the data communications device can authorize any outgoing connections to data storage systems from a vendor network.

In yet another embodiment, the step of obtaining connection information for the data communications device comprises the steps of providing, to a connection monitor computer system, a request for an address of a data communications device. Preferably, the request includes data communications device selection criteria allowing the connection monitor computer system to select and return an address of an available data communications device that is authorized to establish the second packet communications session to the data storage system. The method operating in the computer system then receives the address of the data communications device selected by the connection monitor computer system. As an example, the address of the data communications device might be the next available router address of a router capable of connecting to a specific data storage system.

In a further embodiment, the request for an address of the data communications device includes at least one of i) a portion of the user authentication information, ii) customer information concerning a customer operating the data storage system, and iii) connection information associated with the data storage system. The connection monitor computer system can compare the request for an address against user and customer data to determine what data storage systems a user providing the request is allowed to access. Selection of such a useable data communications device address might be based, for example, on a combination of geographical proximity to the data storage system to which the connection is being established and/or on the identity of the support engineer user requesting such connection access.

In still another embodiment of the invention, the step of initiating the first packet communications session establishes an internet protocol communications session between the computer system and the data communications device. Also in this embodiment, the step of providing, to the data communications device, first packet communications session authentication information passes user authentication information from the computer system to the data communications device to allow the data communications device to authorize (and authenticate) the internet protocol communications session. This allows for secure communications to take place in all instances.

In another embodiment, the step of providing, to the data communications device, first packet communications session authentication information causes the data communications device to communicate with an user account computer system to verify if the user of the computer system identified in the user authentication information is authorized to cause the data communications device to establish the first and second packet communications sessions from the computer system, through the data communications device, to the data storage system. The user account computer system can be, for example, a RADIUS (Remote Authentication Dial-in User Services) server operating within the vendor computer network in which the computer system and data communications device operate. This allows the data communications device to authenticate a user who is initiating the first packet communications session connection.

In another embodiment, the step of establishing a second packet communications session from the data communications device to the data storage system comprises the steps of providing, to the data communications device, second packet communications session connection information allowing the data communications device to initiate the second packet communications session from the data communications device to the data storage system. This method embodiment also receives second packet communications session state information indicating a state of the second packet communication session between the data communications device and the data storage system.

In one embodiment, the second packet communications session connection information includes data storage system connection information (e.g., a phone number of a service processor modem, or an address of a Network Interface Card (NIC) in the service processor) associated with the data storage system and user authentication information (e.g., user name, group and password) of the user of the computer system. This information is provided to the data communications device from the computer system.

This action causes the data communications device to perform the steps of initiating (e.g., dialing out or otherwise attempting to connect) the second packet communications session from the data communications device to the data storage system using the data storage system connection information. The data communications device then provides the user authentication information to a remote access server (RAS) associated with the data storage system (e.g., that is launched in the service processor in response to the incoming connection) to allow the remote access server to authorize the establishment of the second packet communications session from the data communications device to the data storage system. The data communications device receives (i.e., from the now operating RAS process) data storage system address information identifying an address of the data storage system to allow the data communications device to establish the second packet communications session. The data communications device then forwards the second packet communications session state information (e.g., connection status including speed, connection state and address information) to the computer system from the data communications device to allow the computer system to perform the step performing packet communications between with the computer system and data storage system using the first and second packet communications sessions.

In certain embodiments, the data storage system address information is a pre-configured network address (e.g., an IP address) assigned to the service processor in the data storage system. Such an address assignment may be made by the vendor of the data storage system and all data storage systems installed in all customer facilities can be configured with the same data storage system address. This avoids requiring the vendor to track different addresses for different data storage systems. Instead, by maintaining a vendor database of data storage system connection information containing the phone number of the service processor modem, the system of the invention can be used to dial out from a particular data communications device to the data storage system, then ask the data storage system for its address (which is the same address for every data storage system), and then the data communications device can configure this address as the route or path for communications destined for this data storage system (e.g., from the host). However, the router or other data communications device can only then support one such connection to a commonly addressed data storage system at one time, since each data storage system uses the same address.

In another embodiment, the second packet communications session connection information includes data storage system connection information including an a phone number of a service processor modem associated with the service processor in the data storage system. In such cases, the step of initiating the second packet communications session from the data communications device to the data storage system causes the data communications device to instruct a modem (e.g., in a modem bank under control of a modem manager directed by the data communications device) to dial the phone number of a service processor modem (having that modem phone number) in order to establish a dial up connection to the data storage system from the data communications device.

In still another embodiment, the second packet communications session state information includes the data storage system address information and includes data storage system connection bandwidth information (e.g., a modem speed). In this case, the step of forwarding second packet communications session state information to the computer system from the data communications device causes the data communications device to perform the step of forwarding the second packet communications session state information to a network manager computer system (e.g., a workstation on the vendor network operating the Simple Network Management Protocol (SNMP)) which receives the second packet communications session state information and forwards routing information, such as the network address in use by the data storage system (e.g., the statically defined or pre-configured IP address of the data storage system), to the computer system so that the computer system can perform packet communications with the data storage system.

In another embodiment, the step of performing packet communications between the computer system and data storage system comprises the steps of receiving the second packet communications session state information in response to the step of forwarding and adjusting connection bandwidth associated with the first packet communications session (e.g., outbound data rate form the host) to match connection bandwidth associated with the second packet communications session (e.g., the speed of the modem connection from the data communications device to the data storage system). The method also provides computer system address information (e.g., an IP address of the host) to the data storage system so that the data storage system can establish a route to the computer system. Then, using the first packet communications session between the computer system and the data communications device and the second packet communications session between the data communications device and the data storage system, the method performs packet communications between the computer system and the data storage system. In this manner, both the host and the data storage system can operate software applications that can communicate, for example, using TCP/IP.

In certain embodiments, the steps of establishing a first packet communications session, establishing a second packet communications session and performing packet communications are performed using secure and authenticated communications sessions. This ensures that the integrity of the communications and connection processes is maintained.

Other embodiments relate to methods, techniques and operations that take place within a data storage system to establish a packet communications session with a computer system. Generally, these method embodiments perform the handshaking, signaling and messaging operations that correspond to the operations discussed above for the computer system. In other words, when the computer system performs the connection process to carry out the method embodiments summarized above, the data storage system carries out the method embodiments discussed below to form a sort of connection protocol or handshaking in order for the packet communications session to be established between the data storage system and the computer system.

One such method embodiment operates in a data storage system and comprises the steps of receiving a request to initiate a packet communications session and providing data storage system address information to an initiator of the request. The method also receives computer system address information to allow the processor in the data storage system to perform packet communications with the computer system and establishes a packet communications session with the computer system based on the computer system address information.

In another embodiment, the request to initiate a packet communications session received at the data storage system includes user authentication information of a user of the computer system. In such cases, the method further comprises the step of authenticating an identity of the user based on the user authentication information in order to authorize the establishment of the packet communications session to the data storage system. In this manner, the incoming connection is authenticated and authorized to enforce security policies.

In another embodiment, in response to the step of authenticating an identity of the user, the processor establishes a packet communications session with a data communications device from which the request to initiate a packet communications session originates.

In a further embodiment, the processor is a service process in the data storage system and the data storage system address information is a pre-configured network address (e.g., as explained above) assigned to the service processor in the data storage system by a vendor of the data storage system.

In still another embodiment, the request to initiate a packet communications session is sent from a data communications device interconnected (e.g., on a vendor computer network) with the computer system. In such cases, the step of providing data storage system address information provides a network address of the processor in the data storage system to the data communications device for receipt by the computer system to allow the computer system to perform packet communications to the data storage system.

In another embodiment, the step of establishing a packet communications session with the computer system establishes route information within the data storage system based on the computer system address information to allow the processor to perform packet communications with the computer system. This may be done, for example, by a router service process operating within the data storage system.

Other embodiments of the invention relate to computer systems configured in various manner, and in particular, to computer systems and data storage systems which are configured to perform all of the methods and techniques disclosed herein as the invention.

More specifically, certain embodiments of the invention relate to a computer system configured to operate according to embodiments of the invention. Generally, the computer system can be any type of computerized device that comprises a processor, an input-output mechanism (e.g., a keyboard and monitor, mouse, or other input-output devices), an interface (e.g., an Ethernet connection, dial-up connection, optical connection, or other type of network connection) capable of coupling to a computer network, a memory system (e.g., Read Only Memory, Random Access Memory, PROM, EEPROM or other type of memory) encoded with a connection application (e.g., a software dialer process or service application equipped with such functionality), and an interconnection mechanism coupling the processor, the interface and the memory system. In such embodiments, the processor performs, among other processes, the connection application as a connection process (e.g., an application on the host computer system) which causes the computer system to establish a packet communications sessions to a data storage system by performing any or all the method operations explained herein as embodiments of the invention. It is to be understood that the computer system can also perform an operating system and possibly other software processes in addition to the connection application process of embodiments of this invention.

Other embodiment include data storage system configured to perform the method operations of a data storage system as explained herein. Generally, such data storage system embodiments includes a processor (e.g., a service processor or other processor coupled to and integrated within the data storage system), an interface (e.g., a service processor modem or other connection to the processor) capable of coupling to a computer network, a memory system associated with the processor encoded with a communication application (e.g., a service application configured to operate the methods within the data storage system), and an interconnection mechanism coupling the processor, the interface and the memory system. In such data storage system embodiments, the processor performs the communication application as a communication process which causes the processor in the data storage system to establishing a packet communications session with a computer system by performing the method embodiments explained herein.

Still other embodiments relate to a system for establishing packet communications between a computer system and a data storage system. In one such embodiment, the system comprises a vendor computer network including at least one computer system and at least one data communications device capable of communicating with a computer network other than the vendor computer network. The computer system is equipped with a connection application that when performed as a connection process in the computer system causes the computer system to perform the any or all of the operations of the computer system method embodiments explained herein.

Other embodiments of the invention that are disclosed herein include software programs to perform any or all of the method operations summarized above and disclosed in detail below. In particular, such embodiments include a computer program product having a computer-readable medium including computer program logic encoded thereon that when performed on computer systems and data storage systems, causes the computer systems and data storage systems to establish packet communications with each other. In such embodiments, when the computer system (e.g., connection application logic and connection process) or data storage system computer program logic (e.g., service application and service process logic) is performed on a respective processor in either the computer system (for connection process logic) or the data storage system (for the service application logic), the computer program logic causes the processor to perform any or all of the method operations disclosed herein as the invention. These embodiments of the invention are typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system or a Data Storage System (DSS) to cause the computer system of data storage system to perform the respective techniques explained herein as the invention on either of these computing platforms.

It is to be understood that the system of the invention can be embodied strictly as a software program, as software and hardware, or as hardware (e.g., circuitry) alone. It is also to be understood that the data storage system may be a simple single disk system or may be a highly complex large-scale file server, RAID or other type of data storage system and that the computer system can be any type of computing platform such as a workstation, personal computer, mainframe, laptop computer, dedicated computer device, or the like that typically performs under control of an operating system. An example of a data storage system is the Symmetrix line of data storage systems manufactured by EMC Corporation of Hopkinton, Mass. The invention may be embodied in software applications manufactured by EMC Corporation of Hopkinton, Mass. and installed on EMC's support computer network in one or more locations worldwide in order to provide remote support of Symmetrix data storage systems installed and operating in customer facilities throughout the world.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Embodiments of the present invention provide techniques and mechanisms that allow a computer system to establish a secure, reliable and authenticated packet-based communications session, such as a communications session that uses the Internet Protocol (IP), to a service processor in a data storage system. In a typical implementation, embodiments of the invention operate as a connection process within a computer system such as a technical support workstation, and as a service process within a service processor in a data storage system. It is to be understood, however, that the operations of the invention can operate within any type of computer system and upon any processor within a data storage system. Embodiments of the invention relate to the way in which the connection process and service process negotiate between each other and various components in a computing system environment in order to establish the secure and reliable packet communications session. The resulting connection established between the computer system and the service processor allows, for example, applications operating on either the computer system or within the service processor in the data storage system to communicate using the Transmission Control Protocol/Internet Protocol (TCP/IP).

Figure 1:
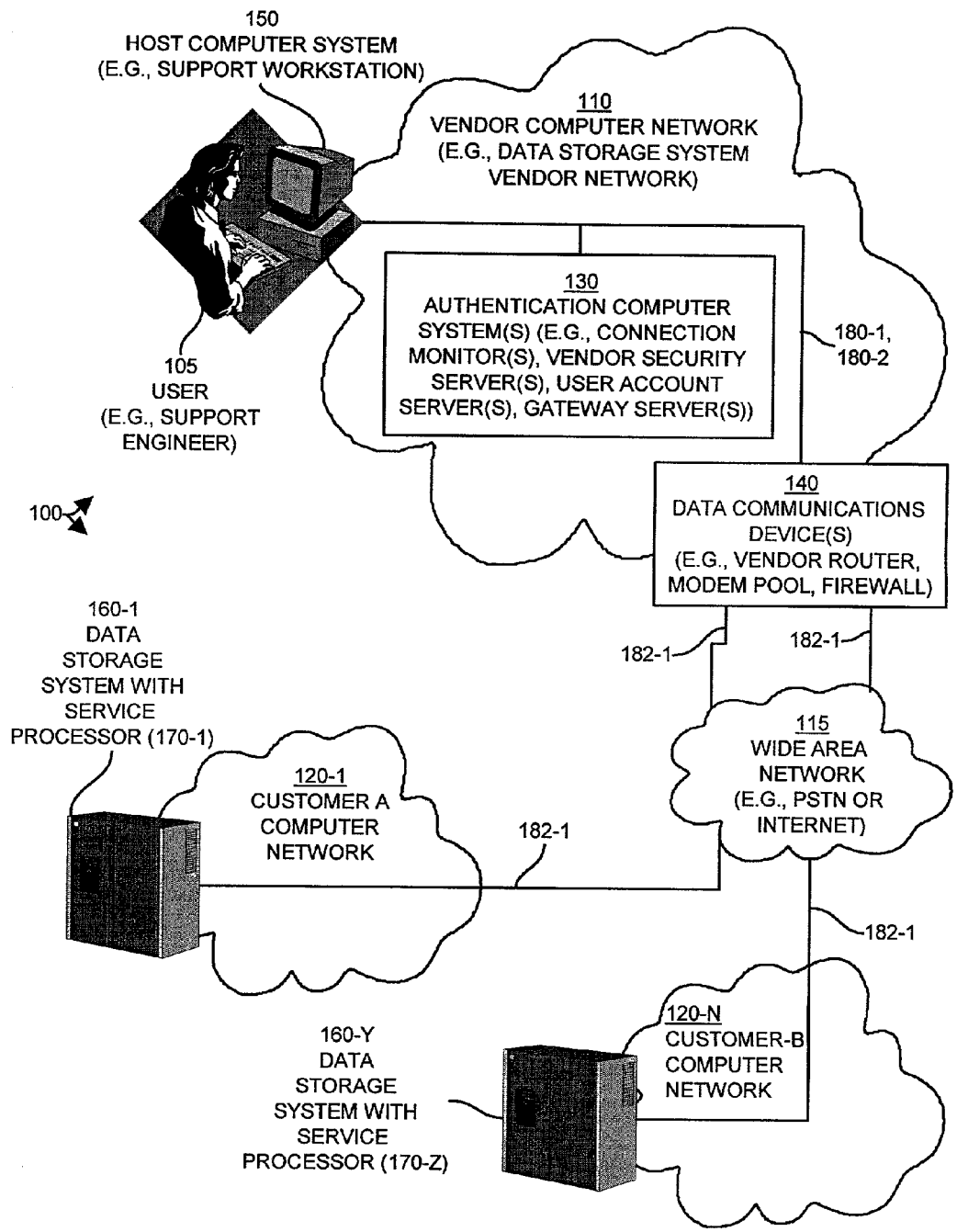
FIG. 1 illustrates a computing system environment including a computer system and a service processor within a data storage system that are capable of performing packet communications with one another in accordance with embodiments of the invention.

FIG. 1 illustrates an example computing system environment 100 configured to operate in accordance with embodiments of the invention. In this example, the computing system environment 100 includes a data storage system vendor computer network 110, a wide area network 115 such as a public switched Telephone Network (PSTN) or the Internet, and a plurality of customer computer networks 120-1 through 120-N (only two shown in this example).

The vendor computer network 110 represents a corporate local or wide area computer network (LAN or WAN) operated by a vendor or manufacturer of data storage systems (160 in FIG. 1, to be explained shortly). The vendor computer network 110 includes one or more computer systems 150 (only one shown in this Figure), one or more connection establishment computer systems 130, and one or more data communications devices 140. The computer systems 150 can be, for example, technical service and support workstations operated by vendor support engineers (e.g., users 105). It is to be understood that the computer system 150 can be any type of computing device that is capable of communicating over a computer network. Examples include personal computers, workstations, minicomputers, mainframes, personal digital assistant devices (PDAs), dedicated computing devices or the like which typically operate software such as an operating system that provides general computing functions such as receiving and transmitting input and output information and data processing functions. The computer systems 150 operate according to embodiments of the invention preferably to provide remote support and maintenance of data storage systems 160.

The connection establishment computer systems 130 can include a number of different computer systems and components that support various authentication, authorization and communications handshaking functions (e.g., connection establishment protocols and handshaking techniques defined by embodiments of the invention) as will be explained in detail. The data communications devices 140 can include one or more routers, modems and/or gateway firewall devices that provide data communications functionality and security between the vendor computer network 110 and other networks such as the wide area network 115 and customer computer networks 120, as will be explained shortly.

In this example, only one vendor computer network 110 is illustrated. It is to be understood that multiple vendor computer networks 110 can be configured according to embodiments of the invention and can be physically coupled to a wide area network 115 such as a circuit switched network such as a PSTN and/or to a computer network such as the Internet, for example, at various locations throughout the world.

Two customer computer networks 120-1 (operated by CUSTOMER A) and 120-N (operated by CUSTOMER B) are shown in this example. It is to be understood that there may be any number of customer computer networks 120 that may couple to each other, to a wide area network 115 such as a telephone network (PSTN) or the Internet, or which may couple directly to the vendor computer network 110. Each customer computer network 120 includes one or more data storage systems 160 (only one shown for each customer network in this example) which each include a respective service processor 170 (not specifically shown as a separate component of the data storage systems 160 in FIG. 1). The customer computer networks 120 can represent, for example, storage area networks (SANs) in which case there are typically multiple data storage systems 160 within a single customer computer network 120. Assume for this example that the data storage systems 160 store data for customer computer systems (not specifically shown in this example) that operate relative to the customer computer networks 120. Also assume for this example that the data storage systems 160 are manufactured by, and are under a service or maintenance contract with a data storage system vendor that owns and operates the data storage system vendor computer network 110.

Generally with respect to FIG. 1, according to embodiments of the invention, a user 105 can operate the computer system 150 to establish respective first and second packet communications sessions 180 and 182 between a computer system 150 and a service processor 170-1 through 170-Z within one of the data storage systems 160-1 through 160-Y. For example, in order to provide remote support functions to the data storage system 160-1 on the customer computer network 120-1, the support engineer 105 may operate the computer system 150 according to embodiments of the invention to establish: i) a first packet communications session 180-1 (e.g., an IP connection of the corporate LAN 110) to the data communications device 140, and ii) a second packet communications session 182-1 (e.g., a dial-out PPP connection supporting IP over a telephone WAN 115) between the data communications device 140 and a service processor 170-1 within the data storage system 160-1.

The packet communications sessions 180 and 182 provide a secure and reliable communications channels that require user authentication and authorization prior to allowing data communications to take place between a computer system 150 and a data storage system 160. Since the communications sessions 180 and 182 represent packet-based connections that operate, for example, according to the commonly used Internet Protocol, data storage system management applications can operate either in the computer systems 150 or on the service processors 170 within the data storage systems 160 and can communicate with each other in a standard manner, such by using TCP/IP. This avoids the problem which is present in conventional service processor communications techniques that require intimate knowledge of complex proprietary communications protocols and technologies to access service processor functionality within conventional data storage systems that are not equipped with embodiments of the invention.

Also as will be explained, the mechanisms and techniques of embodiments of the invention allow a vendor to configure multiple data storage systems 160 with the same network addressing information. For example, the vendor of data storage systems 160-1 through 160-Y can pre-configure these data storage systems 160 prior to delivery and installation in the customer computer networks 120 to each contain the same IP addressing information. This avoids requiring the vendor or the customers from having to track and maintain separate individual network addresses for each data storage system 160 deployed into computer networks throughout the world.

Figure 2:
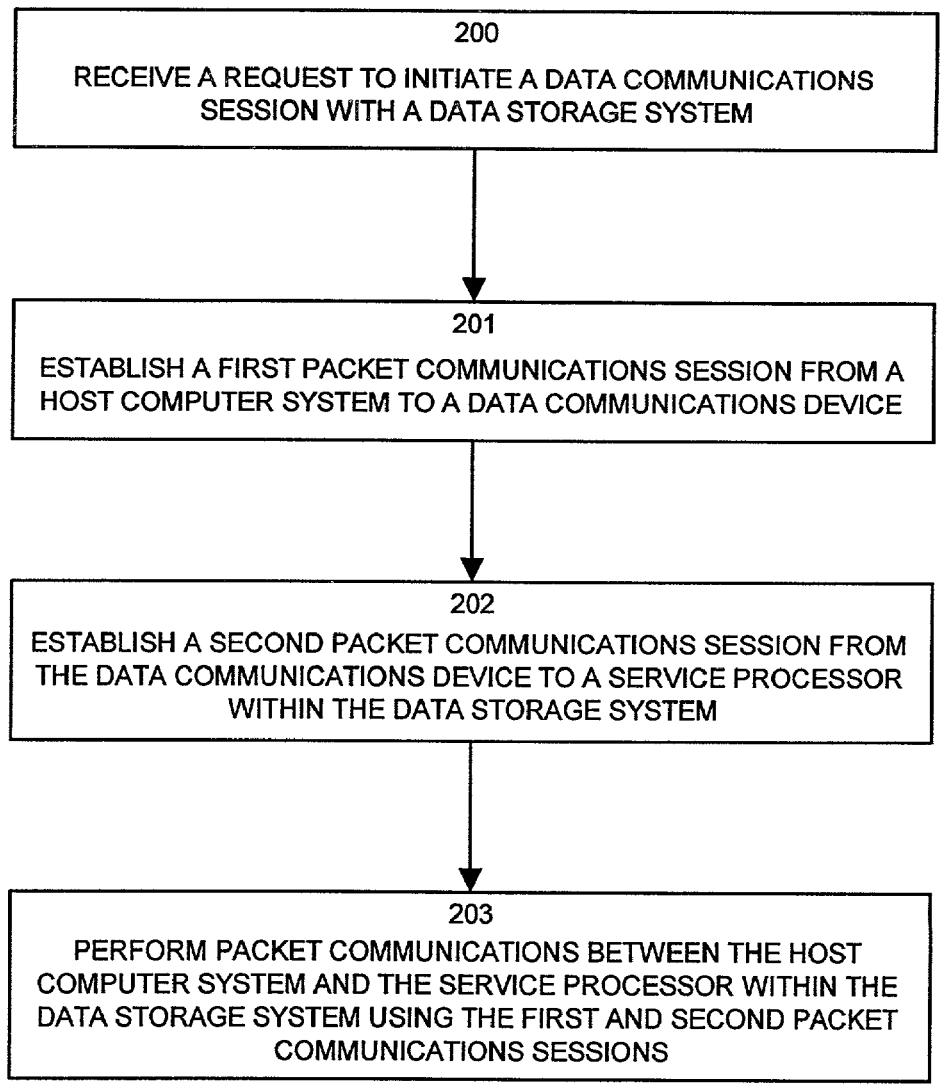
FIG. 2 illustrates a flow chart of processing steps that show the general operation of a computer system configured according to one embodiment of the invention.

FIG. 2 illustrates a flow chart of processing steps that show the high-level operation of a computer system 150 configured in accordance with one embodiment of the invention. The processing steps shown in FIG. 2 will be explained with reference to the example computing system environment 100 illustrated in FIG. 1.

In step 200, the computer system 150 receives a request (not shown in this figure) to establish a communications session with the data storage system 160. As an example of such a request, perhaps a diagnostic program (not specifically shown) operating in the service processor 170 in the data storage 160 system detects a problem within a component (e.g., a failed power supply among a set of redundant power supplies) in the data storage system 160. The service processor 170 may activate modem functionality (not shown in this figure) to "call home" to the vendor computer network 110 to report the problem. During the call home process, the diagnostic program in the service processor 170 can send a "service ticket" to a problem database (not shown) maintained within the vendor computer network 110. The service ticket indicates the nature of the problem within the data storage system 160. The computer system 150 (e.g., under the control of a service technician 105) can operate according to the invention to receive the service ticket information in conjunction with user authentication information (e.g., a service technician's user name/password and domain name/domain name password). Such information may form the request to establish a communications session with the data storage system 160. Suppose for this example that the service processor 170-1 within the data storage system 160-1 returns a service ticket to the vendor computer network 110 that indicates that a problem exists within the data storage system 160-1

Next, in step 201, in response to such a request, the computer system 150 can establish a first packet communications session 180 (e.g., 180-1) from the computer system 150 to a data communications device 140 that is capable of communicating with the specific data storage system 160-1 that is experiencing the problem. The data communications device 140 may be, for example, a combination of a modem bank under the control of one or more vendor routers that couples the vendor computer network 110 to a wide area network 115 such as the Internet which in turn couples to CUSTOMER A's computer network 120-1. As will be explained in detail shortly, establishment of the first packet communications session 180-1 (e.g., from the host 150 to the router/modem combination 140) can involve selecting a specific data communications device 140 (e.g., a specific router and modem combination) within a portion of the vendor network 110 which is closest in distance (e.g., geographically) to the service processor 170-1 within the data storage system 160-1 to which the complete data communications connection (e.g., combination of IP sessions 180-1 and 182-1) from the computer system 150 is to be established. For example, if the vendor computer network 110 is a worldwide network, the techniques of embodiments of the invention may select a data communications device 140 that is located in a portion of the vendor computer network 110 that is geographically close to the portion of the customer computer network 120 containing the data storage system 160 that is experiencing the problem. Furthermore, establishment of the first packet communications session 180-1 can include a process of authenticating and authorizing an identity of the user 105 attempting to establish a communications session with that specific data storage system 160-1.

In step 202, once authentication and authorization techniques have taken place to establish the first packet communications session 180-1, the computer system 150 establishes a second the packet communications session 182-1 from the data communications device 140 to the service processor 170-1 within the data storage system 160-1.

Generally, establishment of the second packet communications session 182 in step 202 involves providing data storage system connection information and user authentication information from the computer system 150 to the data communications device 140 to allow the data communications device 140 to initiate the second packet communications session 182-1 to the service processor 170-1 within the data storage system 160-1. Such information may include, for example, the phone number of a remote service processor modem associated with the service processor 170-1 within the data storage system 160-1. Using this information, the data communications device 140 (e.g., router and modem combination) can initiate a dial-up or other type of connection to the service processor 170-1. If the wide area network 115 (FIG. 1) is a telephone network, then a modem (not shown in FIG. 1) associated with the data communications device 140 can call a modem (not shown in FIG. 1) associated with, for example, a service processor (not shown) within the data storage system 160-1. Over such a modem connection, the data communications device 140 and the data storage system 160-1 can establish, for example, an IP connection 182-1 according to embodiments of this invention. Once such a connection 182-1 is initiated, a service process (not shown in FIG. 1) operating within the service processor 170-1 can receive the data storage system connection information and user authentication information and can authenticate the user prior to allowing the connection 182-1 to be fully established. The service processor 170-1 can then negotiate with the data communications device 140 to establish the value of the data storage system address (e.g., a pre-assigned IP address for the service processor 170 within the data storage system 160).

During this process, the computer system 150 can receive feedback indicating the status of the establishment process used to configure the second packet communications session 182 between the data communications device 140 and the data storage system 160. Once such feedback indicates the connection 182-1 is usable, the computer system 150 can adjust a data transmission speed to be commensurate with the second connection and can provide the service processor 170-1 with computer system connection information such as the network address currently in use by the computer system 150. The service processor 170-1 in the data storage system 160-1 can use this information to establish a network route back to the computer system 150 (i.e., back to the host address) through the data communications device 140. In this manner, the second packet communications session 182 from the data communications device 140 to the data storage system 160 is fully established.

Next, in step 203, the computer system 150 performs packet communications between the computer system 150 and the service processor 170-1 within the data storage system 160-1 using the first and second packet communications sessions 180-1 and 182-1. Since a service processor 170 within a data storage system 160 can establish a route back to a computer system 150, packet communications can take place, for example, using a protocol such as TCP/IP in both directions. Using these techniques, applications can operate on both the computer system 150 and within a service processor 170 in a data storage system 160. The connections 180 and 182 use authentication and encryption techniques to provide secure data communications channels. This allows the development of data storage system management applications that do not require intimate knowledge of complex and proprietary protocol schemes. Since security, authorization and authentication issues are handled by embodiments of the invention for each of the first and second packet communications sessions 180 and 182, application developers need not be concerned with these types of issues.

Embodiments of the invention can provide the packet-based communications sessions 180 and 182 between computer systems 150 and service processors 170 within respective data storage systems 160, for example, in order for users 105 of those computer systems to perform support functions (e.g., routine or preventative maintenance war unscheduled maintenance in the event of failures) within the data storage systems 160. Such descriptions of embodiments of the invention are provided however by way of example only. It is to be understood that embodiments of the invention are not limited to such uses and that applications of any sort may operate for any reason within a computer system 150 to use the packet communications sessions 180 and 182 to communicate with a service processor 170 within the data storage system 160. It is also to be understood that the service processor 170 is not required to perform service functionality. Instead, the service processor 170 represents any type of computerized processing mechanism within a data storage system 160 twitchy packet communications session might need to be established. As an example, a customer who manages a data storage system 160 may create a vendor-specific software application that operates in a computer system 150 within a customer computer network that is separate from the customer computer network 120 to which the data storage system 160 is coupled. In such cases, the techniques of embodiments of the invention can be used to allow the application in a computer system in the first customer computer network to access service processor functionality and the second customer computer network using packet based communications provided by embodiments of the invention. The service processor functionality in this example might represent customer specific functionality provided by the application operating on the service processor 170 and is not limited to vendor specific service functionality.

Figure 3:
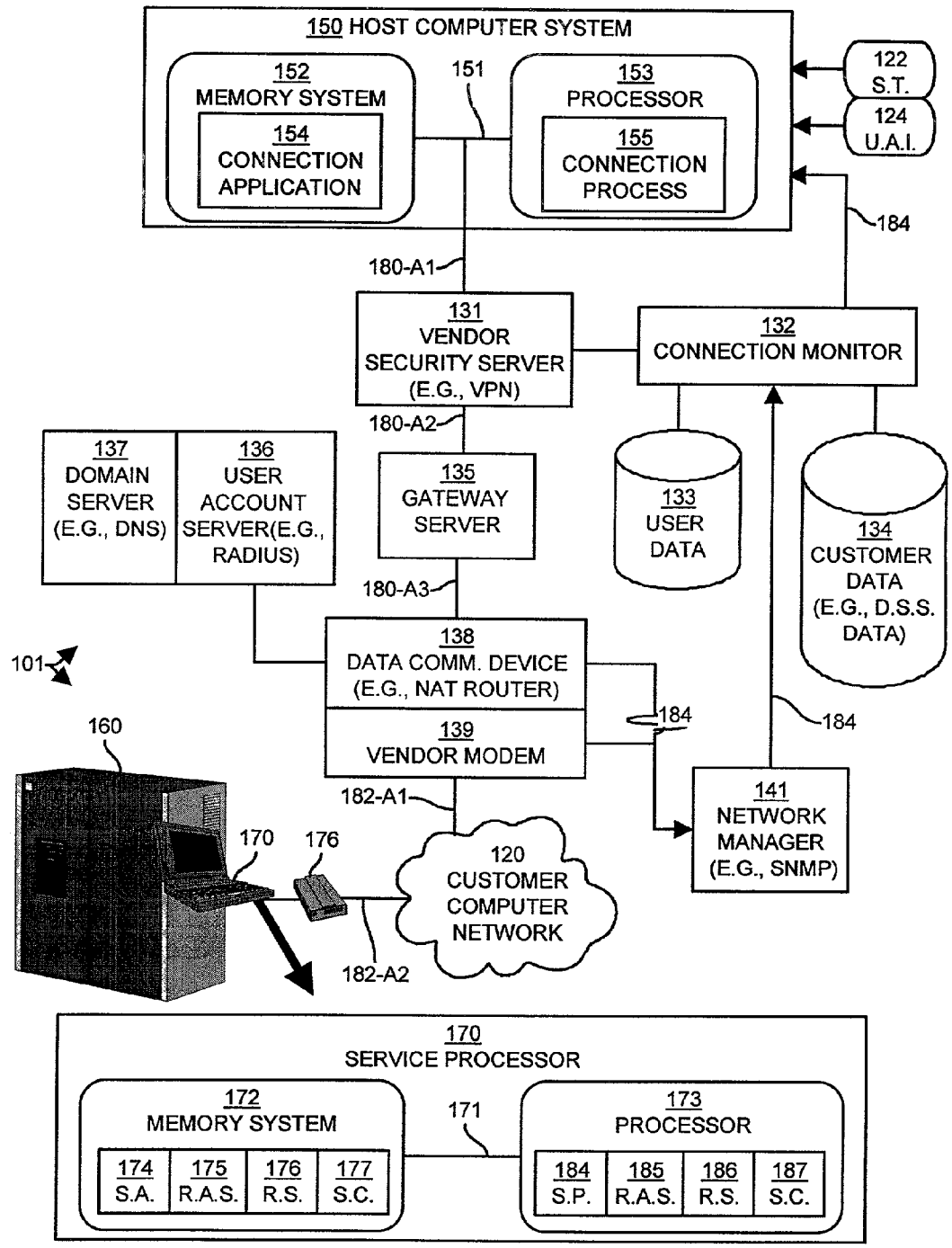
FIG. 3 illustrates a computing system environment that supports secure and reliable Internet Protocol communications between a computer system and a service processor within a data storage system in accordance with embodiments of the invention.

FIG. 3 illustrates a another computing system environment 101 configured in accordance with embodiments of the invention that illustrates more detailed embodiments of the invention. In particular, as shown in FIG. 3, the computer system 150 includes an interconnection mechanism 151 such as a data bus which interconnects a network interface (not specifically shown), an input-output mechanism (e.g., a keyboard, monitor and mouse, for example, not specifically shown), a memory system 152 and a processor 153. The memory system 152 is encoded with logic instructions (e.g., software code) that form a connection application 154 configured according to embodiments of the invention. When the processor 153 performs (e.g., executes, interprets, runs or otherwise operates) the logic instructions associated with all or portions of the connection application 154, a connection process 155 is formed in the computer system 150 which operates according to embodiments of the invention. That is, the connection process 155 represents the operation of the connection application 154 within the processor 153 and generally represents the functionality of the computer system 150 as configured according to embodiments of this invention.

Components of the vendor computer network 110 include a vendor security server 131, a connection monitor computer system 132, a user data database 133, a customer data database 134, a gateway server computer system 135, a user account server 136, a domain server 137, a network manager computer system 137, a data communications device 138 (a router in this example) and a vendor modem 139. The functionality of each of these components will be explained shortly.

Components of the customer computer network (only such network one shown in FIG. 3) include the data storage system 160 and its associated service processor 170, and a service processor modem 176. As shown in some detail (see arrow in figure), the service processor 170 includes an interconnection mechanism 171 such as a data bus which interconnects a network interface (not specifically shown), a memory system 172 and a processor 173. The memory system 172 is encoded with logic instructions that include various software applications 174 through 177 configured according to embodiments of the invention which are loaded and can operate as respective software processes 184 through 187 within the service processor 170.

Specifically, the memory system 172 is encoded with a service application 174, a remote access server (RAS) application 175, a route service application 176, and a security client application 177 which collectively are configured according to embodiments of this invention. Generally, when the processor 173 performs (e.g., executes, interprets, runs or otherwise operates) the logic instructions associated with all or portions of the applications 174 through 177, the processor 173 forms corresponding processes 184 through 187 which operate according to embodiments of the invention within the service processor 170. By way of example, the service process 184 represents the performance of the service application 174 within the processor 173. The service process 184 generally provides a large portion of the functionality of the service processor 170 and data storage system 160 as configured according to embodiments of this invention and uses or invokes operation of the other applications 175 to 177 (as respective processes 185 through 187) on an as needed basis. In other words, the service process 184 serves as a control program in an operating system-like manner for the service processor 170 with respect to embodiments of this invention.

Briefly, and as will be explained in more detail, the remote access server (RAS) application and process 175, 185 provide user login authorization capability such as user name and password authentication that allows a user 185 to log in to the service processor 170. The route service application and process 176, 186 operates a network routing protocol algorithm that allows the service processor 170 to establish, for example, Internet Protocol routes (i.e., connection paths) from the service processor 170 through the customer computer network 120 to the vendor data communications device 138 and the computer system 150. The security client application and process 177, 187 provides authentication and encryption functionality between the service processor 170 and the data communications device/modem combination 138, 139 via VPN-like security features offered by the gateway server 135. This ensures that the connection 182 between the service processor 170 and the vendor data communications device 138 (e.g., router/modem combination) is secure, reliable and authenticated.

Prior to describing the details of operations of embodiments of the invention, a short description of the various computer system components 131 through 141 (FIG. 3) that operate within the vendor network 110 will be provided to assist in understanding how these components interoperate during performance of the embodiments of the invention.

The vendor security server 131 preferably operates a virtual private network (VPN) protocol that provides a secure, authenticated and encrypted communications channel 180-A2 on behalf of the computer system 150 for communications transmitted between computer system 150 and the data communications device 138. The vendor security server 131 can detect outbound connection attempts 180-A1 made by the computer system 150 and can perform a public key encryption handshaking technique, for example, with the gateway server 135, in order to ensure that all communications 180-A2 between computer system 150 and the data communications device 138 are reliable and secure. To this end, the gateway server 135 operates a corresponding VPN protocol to support the secure communication channels 180-A2 (as well as 182-A1 between the data communications device 138 and the service processor 170). Preferably, the vendor security server 131 and the computer system 151 operate in a secure environment and are in close proximity to one another such that the integrity of the communications channel 180-A1 (a non-encrypted channel) can be assured.

The connection monitor computer system 132 maintains a status or state of the connection (e.g., the first packet communications session 180-1 and the second packet communications session 180-2) between computer system 150 and the service processor 170. Generally, the connection monitor 132 operates as a central monitoring device for any connections 180, 182 made to any service processors 170 within any data storage systems 160. As such, the connection monitor 132 is also aware of the state of each data communications device 138 and vendor modem 139. The connection monitor 132 also provides access to the user data database 133 and the customer data database 134.

The user data database 133 contains authentication and authorization information (e.g., vendor employee user names, passwords and the like) for vendor employees such as the support engineer users 105. The customer data database 134 contains customer information and data storage system information such as customer names, customer facility or site identifications, serial numbers or other identifications of data storage systems 160, and phone numbers or other connection identification information of remote service processor modems 176 for each service processor 170 associated with each data storage system 160. The user data and customer data in the databases 133 and 134 may be accessed directly from, or alternatively may be periodically generated from, for example, other databases (e.g., a vendor Clarify database) maintained by the vendor that store vendor customer information (e.g., customer names, customer addresses, etc.) and/ or from employee related information (e.g., vendor employee databases). Access to these databases 133 and 134 is restricted via database security. Due to the sensitive nature of the databases 133 and 134, the connection monitor 132 and the databases 133 and 134 are preferably housed in a secure vendor facility within the vendor computer network 110.

The user account server 136 is generally responsible for authenticating which users have the ability to dial out or otherwise connection out of the vendor network 110 by accessing the data communications device 138 and vendor modem 139 (e.g., router/modem combination). The user account server 136 may operate, for example, RADIUS server software that maintains user account information. The domain server computer system 137 operates as the domain controller and maintains user authentication and group membership information on behalf of users 105 for the vendor computer network 110. For example, the domain server 137 can maintain windows NT domain user ID, password and group authentication information as well as windows NT global group and user membership information. As will be explained, the user account server 136 and domain server 137 provide authorization information to the data communications devices 138, 139 during establishment of the connections 180 in 182.

The data communications device 138 (only one shown in this example) is preferably a router that operates a control program such as Cisco Systems' Internetworking Operating System (IOS) (manufactured by Cisco Systems of San Jose, Calif., U.S.A.) which can be remotely managed by the computer system 150 or by other components within the vendor computer network 110. According to the operation of certain embodiments of the invention, more than one service processor 170 (i.e., each within a respective data storage system 160) is configured with the same data storage system network address, such as an IP address. In such embodiments, the data communications device 138 operates network address translation (NAT) technology that allows a network address of the service processor 170 in a data storage system 160 to be translated to an internal vendor network address usable within the vendor computer network 110.

This processing provides the ability, for example, to assign the same network IP address to each service processor 170 in each data storage system 160. The router can then use NAT to translate into a different internal vendor computer network address for communication with the computer systems 150. However, in such embodiments, since multiple service processors 170 share a common network address, a single router 138 can only access a single service processor 170 (i.e., using economy assign or shared network address given to all service processors 170) at one time. As such, as will be explained shortly, preferred embodiments of the invention include multiple communications devices 138 (e.g., multiple routers) to allow multiple computer systems 150 within the vendor computer network 110 to concurrently connect to multiple service processors 170 to simultaneously provide support to multiple data storage systems 160. This aspect of these embodiments of the invention provides the ability for the vendor to operate the vendor computer network 110 without having to assign and manage individual network address information for each service processor 170 in each data storage system 160 in all of the vendor's customer facilities (e.g., customer computer networks 120-1 through 120-N).

The network manager computer system 141 preferably operates a network management protocol such as the Simple Network Management Protocol (SNMP) to allow computer system components illustrated in FIG. 3 to report (e.g., 184 in FIG. 3) status information concerning connection status to the network manager 141. In turn, the network manager 141 can provide connection status information 184 to the connection monitor computer system 132 (discussed briefly above) in order for the connection monitor 132 to track the state of connections 180,182 between computer systems 150 in service processors 170 within data storage systems 160.

As noted above, the gateway server 135 handles the authentication, encryption and VPN capability of securing the connections 180 and 182 between the computer system 150, the data communications device 138 (and vendor modem 139) and the service processor 170 using, for example, public-key 128-bit encryption technologies.

Figure 4:
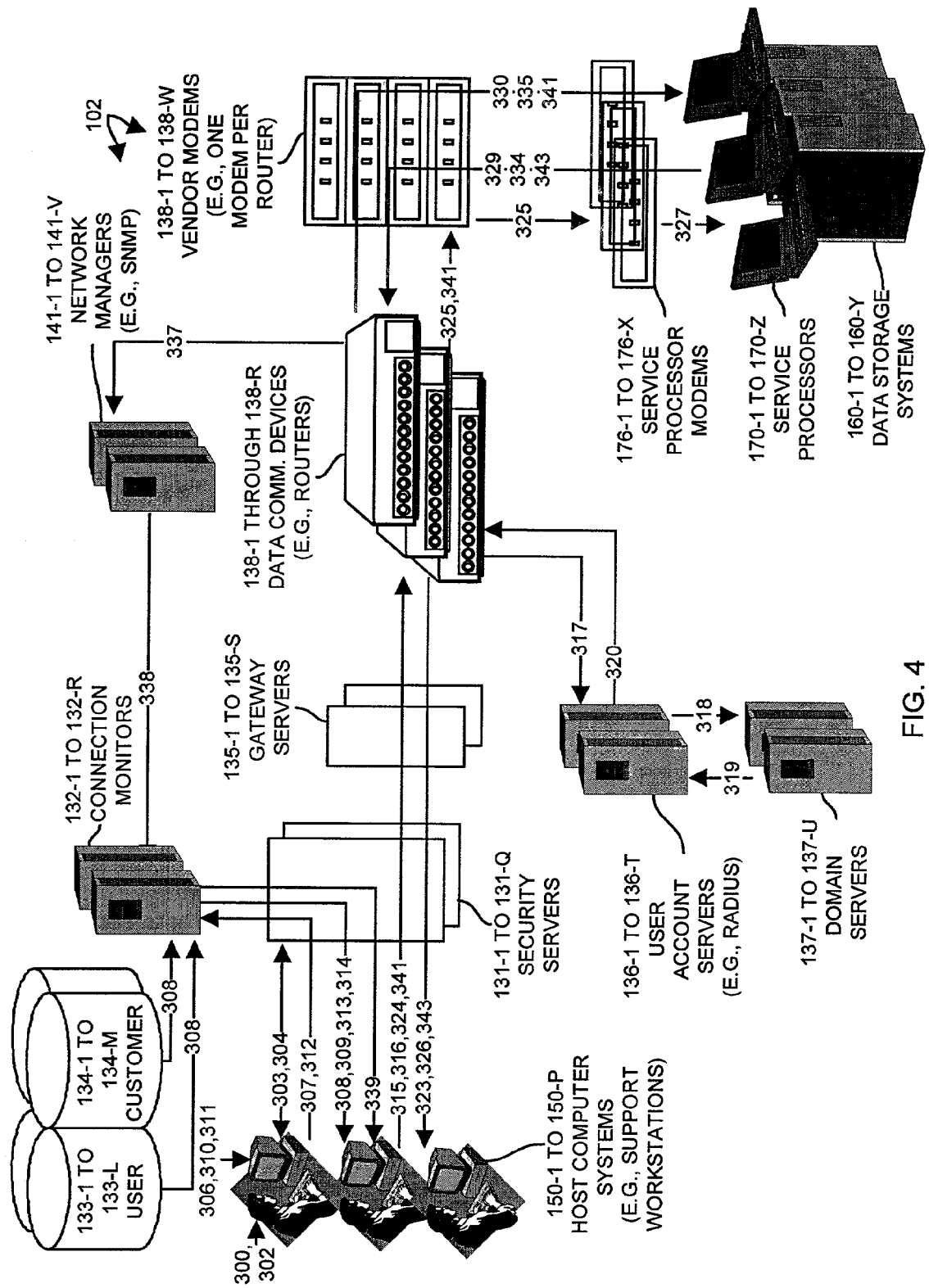
FIG. 4 illustrates a computing system environment that shows communications that take place between various computer systems and components in a redundant arrangement of the computing system environment illustrated in FIG. 3.
Figure 5:
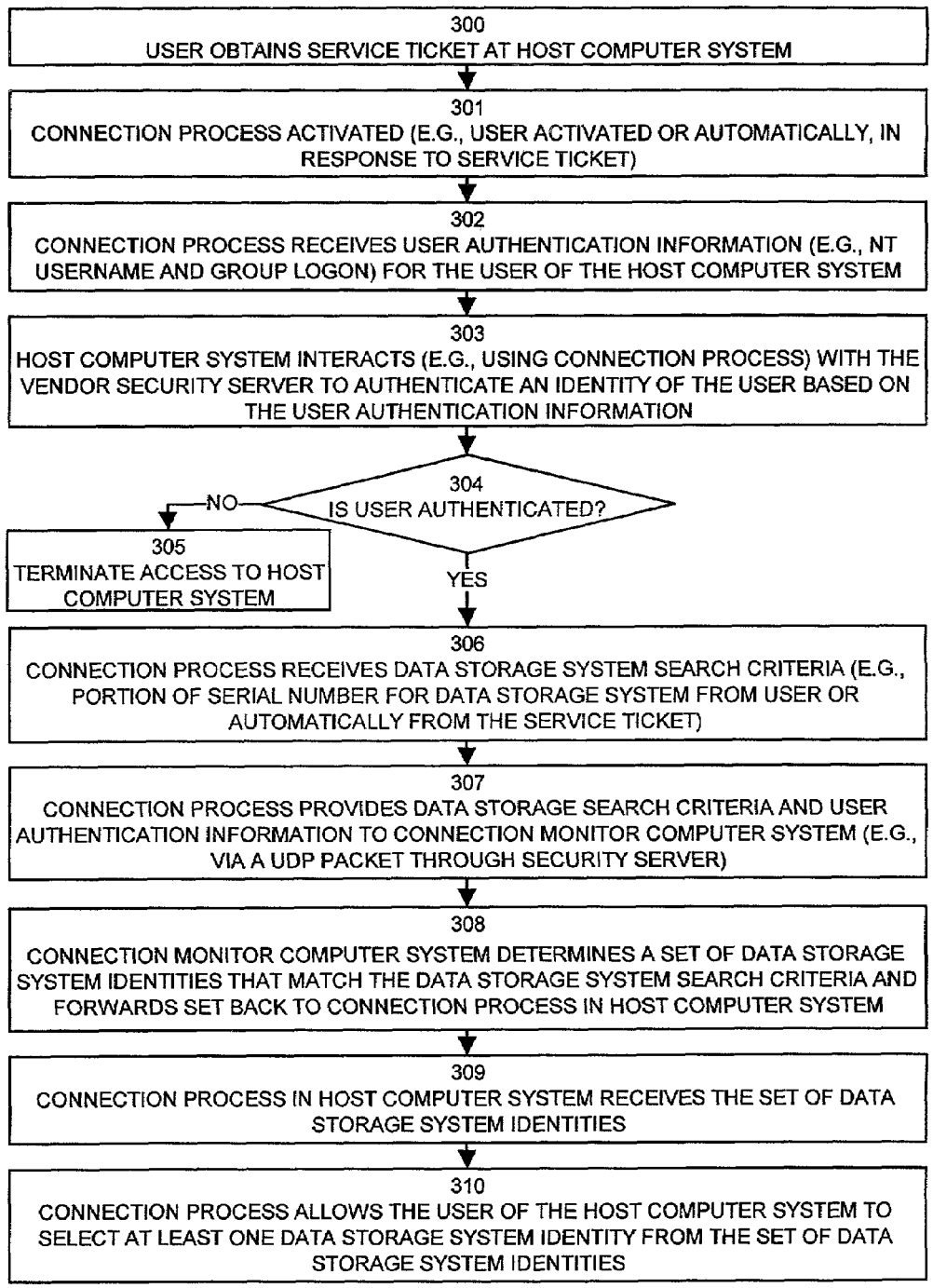
FIGS. 5 through 9 illustrate processing steps as performed by one example embodiment of the invention to allow a computer system and a service processor within a data storage system to communicate using packet communications sessions.

FIG. 4 illustrates a computing system environment 102 containing similar components as those illustrated in the computing system environments 100 and 101 in FIGS. 1 and 3. However, in the computing system environment 102 in FIG. 4, many of the components which operate according to the functionality of embodiments of the invention are provided in a redundant manner such that if one of such components fails, another can take over the responsibility of the failed component to ensure that the operations of embodiments of the invention can continue. Furthermore, FIG. 4 illustrates the various communications messages, signaling and handshaking techniques that embodiments of the invention provide between the components shown in figure in order for the system of the invention to establish packet based communications sessions (e.g., 180 and 182 in FIGS. 1 and 3) between computer systems 150 and data storage systems 160 (i.e., service processors 170 within the data storage systems 160).

FIGS. 5 through 9 provide a flow chart of processing steps that show the details of processing as performed by one embodiment of the invention to establish packet based (e.g., IP) communications between computer system 150 and the service processor 170 within a data storage system 160. As the processing steps in FIGS. 5 through 9 are explained in detail below, reference will be made to various components within the computing system environment configurations 100, 101 and 103 (FIGS. 1, 3 and 4, respectively).

With respect to the specific communications which take place between various components within the computing system environments, reference is made to the numbered lines extending between the various components illustrated in FIG. 4. Such numbered lines represent information, messages and/or signaling that is transmitted between these components according to the processing steps in FIGS. 5 through 9. As such, the specific numbering on the lines between the components illustrated in FIG. 4 reflects the step number of the processing steps or operations within FIGS. 5 through 9 which cause such communications, messaging or signaling to take place. The processing steps shown in FIGS. 5 through 9 can be used in conjunction with the signaling produced by certain of the steps as shown in FIG. 4 to gain an in-depth understanding of the embodiment of the invention explained with respect to these figures. It is to be understood however that the details of this embodiment are illustrative of one embodiment of the invention and are not limiting to the operation of other embodiments as explained elsewhere herein or equivalents thereto.

In step 300, a user 105 such as a vendor support engineer obtains a service ticket 122 (FIG. 3) at the computer system 150. As briefly explained above, the service ticket 122 identifies a problem occurring within a data storage system 160 installed within a customer computer network 120 (e.g., via a problem code or other problem identification). The service ticket 122 can also identify, for example, a serial number of the data storage system 160 experiencing the problem or, alternatively, might identify the customer name, facility name or other information regarding the customer that operates the data storage system 160 that is experiencing the problem.

In step 301, the computer system 150 activates the connection process 155. The computer system 150 might automatically activate the connection process 155 in response to receiving the service ticket 122, or, alternatively, the support engineer 105 may review the service ticket 122 (e.g., as a printout) and may manually start the connection process 155.

In step 302, the connection process receives user authentication information 124 (FIG. 3) for the user 105 of the computer system 150. The user authentication information 124 may be, for example, the user's (105) windows NT username, password and group login information for the user 105, who may be a support engineer employed by the vendor that operates the vendor computer network 110.

In step 303, the computer system 150 interacts (e.g., using the connection process 155) with the vendor security server 131 to authenticate an identity of the user 105 based on the user authentication information 124.

In step 304, the computer system receives a response from the vendor security server 131 and determines if the user 105 is authenticated. If the user is not authenticated (e.g., the username and/or password are incorrect) processing proceeds to step 305 at which point the connection process 155 terminates access to the computer system 150 for the use of the connection process 155. In other words, if the user 105 is not authenticated, the user 105 is unable to activate the connection process 155. If the connection process 155 determines that the user is authenticated in step 304, processing proceeds to step 306.

In step 306, the connection process 155 receives the data storage system search criteria from the user 105. Alternatively, the data storage system search criteria may be automatically derived or obtained from information contained within the service ticket 122. The data storage system search criteria may be, for example, a data storage system serial number or portion thereof (e.g., first or last four digits of a data storage system serial number), a customer name, a customer site identification number or other information identifying a customer who operates the data storage system 160 (or identifying the data storage system 160 itself) to which a connection is to be established.

In step 307, the connection process 155 provides the data storage system search criteria and the user authentication information 124 to the connection monitor computer system 132, for example, via a Uniform Datagram Packet (UDP) sent from an interface in the computer system 150 through the security server 131 (providing VPN services) to the connection monitor 132.

In step 308, the connection monitor computer system 132 determines a set of data storage system identities that match the data storage system search criteria and then forwards the set of data storage system identities back to the connection process 155 operating within the computer system 150.

In step 309, the connection process 155 in a computer system 150 receives the set of data storage system identities. The set of data storage system identities is the list of data storage systems 160 to which this user 105 is allowed to connect.

In step 310, the connection process 155 allows the user 105 of the computer system 150 to select at least one data storage system identity from the set of data storage system identities returned from the connection monitor computer system 132. The user may select a particular data storage system, for example, by clicking on the identity of the desired data storage system with an input device, such as the mouse coupled to the computer system 150.

Essentially, steps 306 to 310 allow a user 105 to enter search criteria such as, for example, a portion of a data storage system serial number to which that user desires to establish a packet based communications session (e.g., connections 180 and 182). The connection monitor 132 uses the data defined in the user database 133 and the customer database 134 along with the search criteria to determine the set of data storage system identities that the user 105 is allowed to access. By way of example, if the user 105 is a field service technician assigned to service a certain subset of customer operated data storage systems, such as any data storage systems coupled to CUSTOMER A's computer network 120-1 in FIG. 1 (but not CUSTOMER B's data storage system 160-2), the processing steps 306 to 308 will provide the connection process 155 with a list of only those data storage systems (e.g., only the identity of data storage system 160-1) within that customer's computer network to which that user 105 is allowed to connect. Alternatively, if the user 105 is authenticated as a fully-privileged vendor support engineer, such a user 105 may have access to all data storage systems 160 within all customer facilities. The user database 133 may also contain access or security privileges assigned to each user 105, for example, based on that users group assignment or user ID. In this manner, this aspect of this embodiment of the invention provides a level of access control that helps determine to which data storage systems 160 a user 105 may connect.

Figure 6:
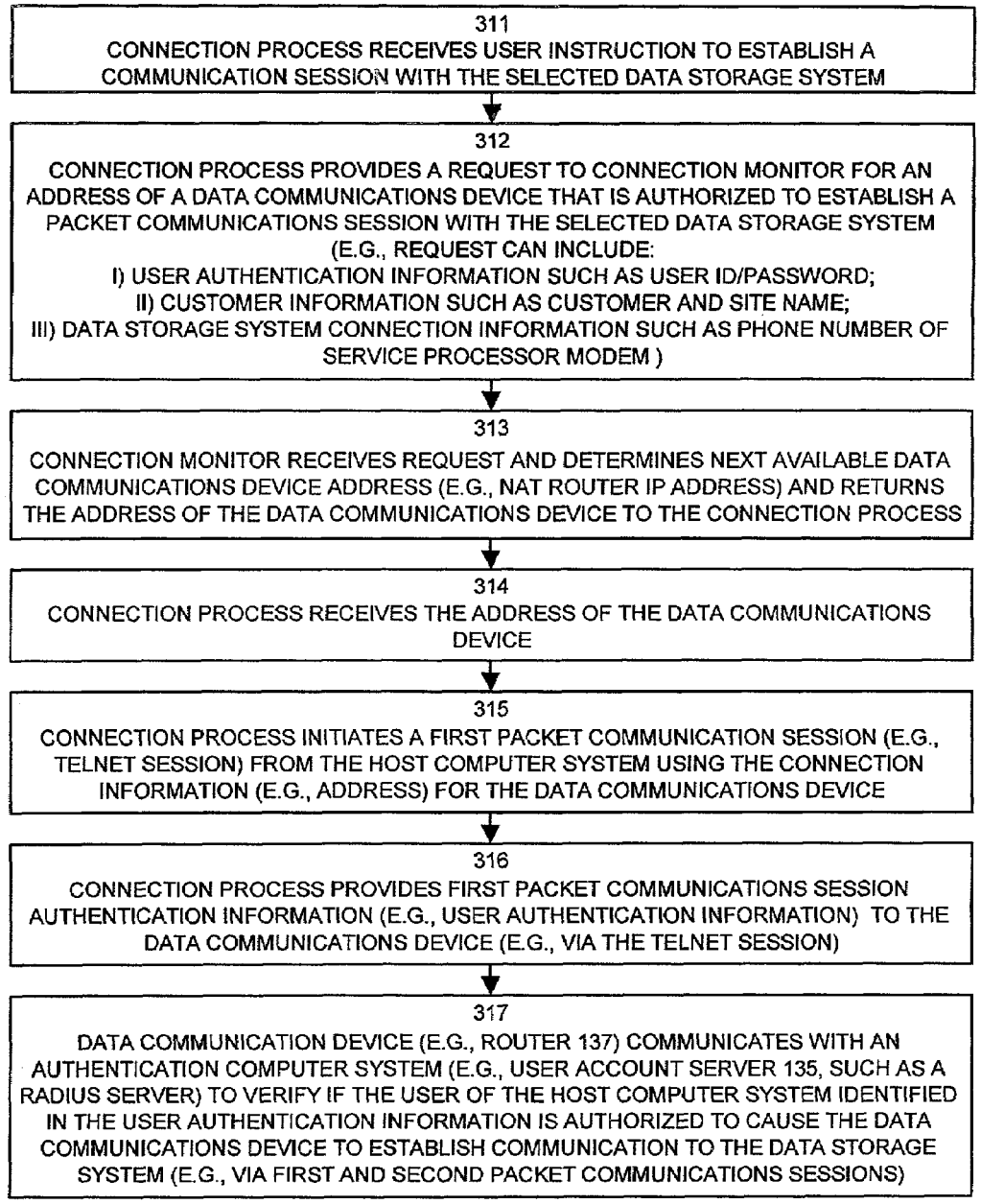
Figure 7:
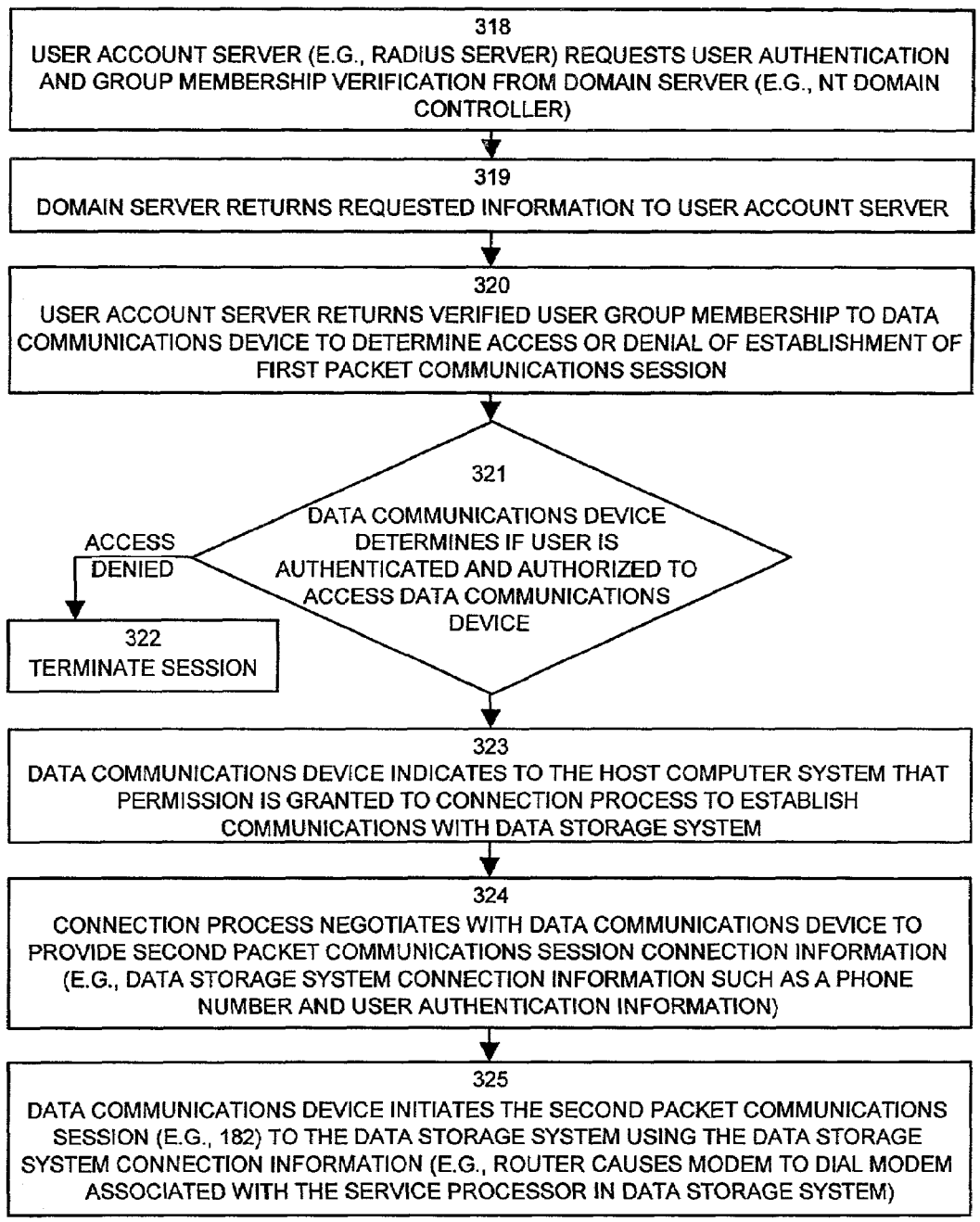
Figure 8:
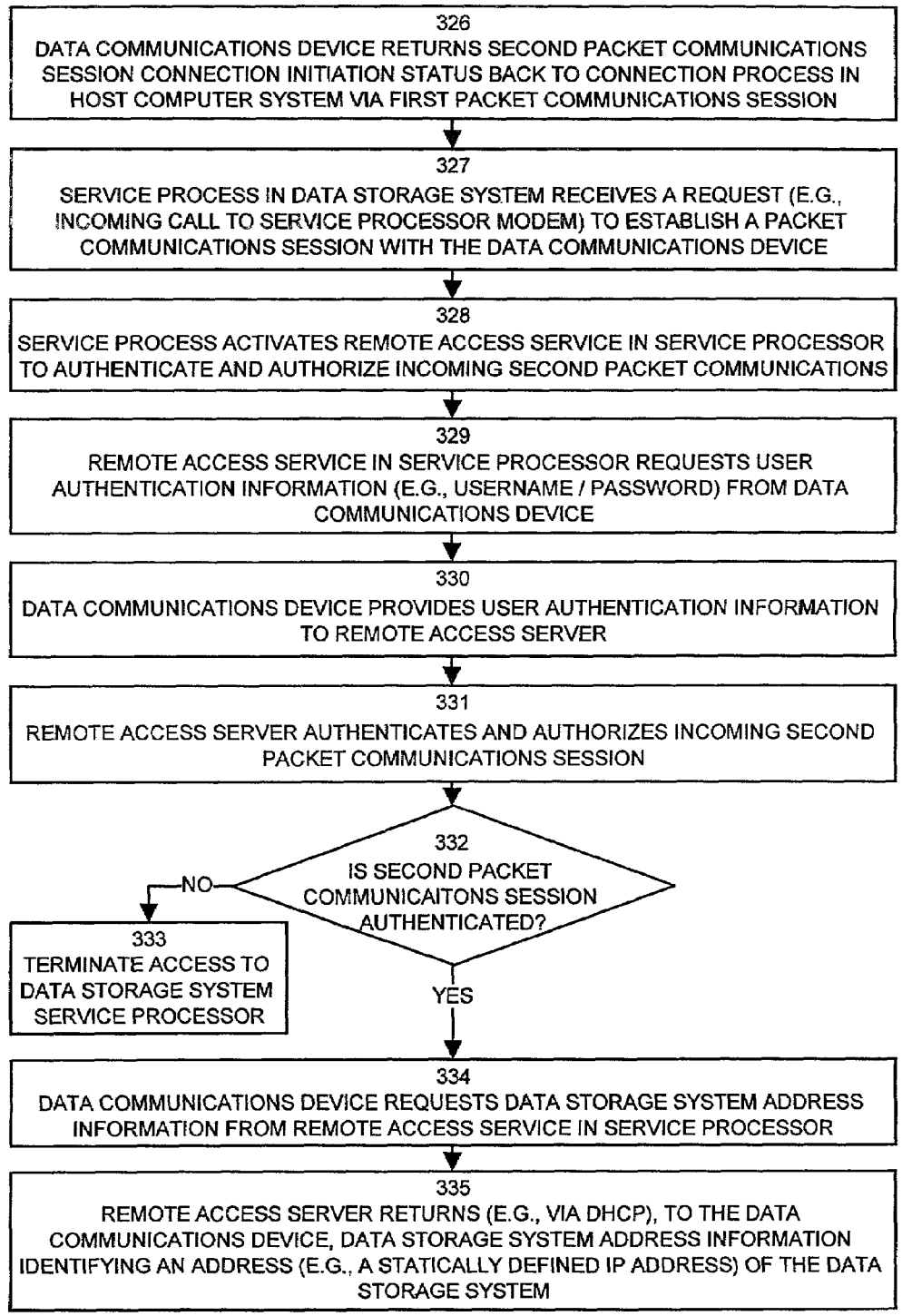

Referring now to step 311 at the top of FIG. 6, the connection process 155 receives a user instruction to establish a communications session (e.g., 180) with the selected data storage system 160. In one embodiment of the invention, the processing steps 310 and 311 may be joined together such that when the user selects a data storage system identity from the set of data storage system identities in step 310, this action causes the processing of step 311 to occur to indicate to the connection process 155 that the user 105 desires to connect to the identified and selected data storage system 160.

In step 312, the connection process 155 provides a request to the connection monitor computer system 132 for an address of a data communications device 138-1 through 138-R (e.g., a request for an IP address of the next available router 138) that is authorized to establish a packet communications session (e.g., 182) with the selected data storage system 160. The request for such an address can include, for example, user authentication information such as the username, user identification (e.g., group name) and user and/or group passwords, as well as customer information such as a customer name and data storage system site name (e.g., as obtained from the set of data storage system identities received by the connection process 155 in step 309) and may also include data storage system connection information such as a phone number of the service processor modem 176 that is associated with the service processor 170 within the data storage system 160 to which the connection is to be established.

As noted above, since each service processor 170 is configured with a common network address (e.g., the same IP address), then a preferred embodiment of the invention allows for a plurality of data communications devices 138-1 through 138-R, such as a pool of routers, to which computer systems 150-1 through 150-P can be assigned to make a connection (e.g., 180-1 and 182-1 in FIG. 1) to a particular data storage system 160. In this manner, each router 138 in this embodiment only supports one connection 182 to one particular data storage system 160 at any one point in time due to the limitation that a single router 138 is only able to route packets for a single service processor 170 using the shared IP address.

In step 313 then, the connection monitor 132 receives the request for an address of the data communications device 138 and determines the next available data communications device address (e.g., the next available IP address of a NAT router 138 within the pool of routers 138-1 through 138-P). In a preferred embodiment, the connection monitor 132 then returns an address of a data communications device 138 to the connection process 155.

In an alternative embodiment, if the connection monitor 132 (which generally tracks connection states of connections from computer system, for example, in a vendor support facility, to data storage systems at customer facilities) detects that another computer system 150 (e.g., another support workstation) already has a connection 180, 182 underway with the selected data storage system 160, then the connection monitor 132 will notify the requesting connection process 155 (the connection process sending the request in step 312) of the already existing connection 180, 182 and will supply user and machine (e.g., computer system and data storage system) identities back to the requesting connection process 155 so that a user of this computer system 150 can obtain the identity of the other user already connected to the data storage system. At this point, the user of the requesting computer system 150 can collaborate (i.e., either physically by walking over to the other computer system already connected, or electronically via collaboration software) with the other user of the other computer system so that the already existing connection 180, 182 to the data storage system 160 can be used to service the data storage system.

In step 313, the connection monitor 132 may use a variety of techniques to select a particular address, and hence the particular data communications device 138, for use by a connection 180 from a particular computer system 150. For example, the connection monitor 132 may choose an address of a data communications device 138 that is located as close as geographically possible to the data storage system 160 to which the connection is to be established. In this manner, connection costs such as long distance telephone call charges incurred between a data communications device 138 and the data storage system 160 to support the connection 182 may be minimized. In an alternative embodiment, in step 313 the connection monitor 132 can use a round robin or a similar load-balanced selection approach to selecting a particular data communications device 138. As another alternative, specific customers can buy or lease dedicated data communications devices 138 to guarantee that a particular device 138 is always available in the event that a data storage system 160 within that customer's facility requires support.

In step 314, the connection process 155 receives the address of the data communications device as selected by the connection monitor 132.

In step 315, the connection process 155 initiates a first packet communications session 180, such as a telnet protocol session, from the computer system 150 to the data communications device 138 using the connection information such as the address of the data communications device received in step 314. Note that the first packet communications session 180 (180-A1, 180-A2 and 180-A3 in FIG. 3) passes through the gateway server 135 on its way to the data communications device 138. In doing so, the vendor security server 131 and the gateway server 135 can operate virtual private network protocols (e.g., 128-bit encryption) to ensure that the connection segment 180-A2 (FIG. 3) which spans the vendor computer network 110 is secure.

In step 316, the connection process 155 provides first packet communications session authentication information to the data communications device 138 over the first packet communications session 180. The first packet communications session authentication information can include, for example, user authentication information (user name, password, etc.) as provided by the user 105 in step 302.

Next, in step 317, the data communications device 138 communicates with an authentication computer system 130 (FIG. 1) such as the user account server 136 (e.g., a RADIUS server, see FIG. 3) to verify if the user 105 of the computer system 150 identified within the user authentication information (124 in FIG. 3) is authorized to cause the data communications device 138 to establish communications (e.g., first and second packet communications sessions 180 and 182) to the data storage system 160.

Specifically, as shown in step 318, the action in step 317 of the data communications device 138 causes the user account server 136 to request user authentication and group membership verification from the domain server 137 (e.g., a Window NT domain controller) for the user authentication information 124 received by the user account server 136 in response to step 317.

In step 319, the domain server 137 returns the requested user and group membership verification information to the user account server 136.

In response, in step 320, the user account server 136 returns verified user and group membership data for the user 105 to the data communications device 138 to allow the data communications device 138 to determine access or denial of establishment of the first packet communications session 180. As a specific example of this router authorization technique, in steps 316 through 320, the connection process 155 passes user authentication information 124 such as a Windows NT user ID, group and password information to the router 138. The operating system within the router 138 is configured to receive this information over the telnet session established in step 315. The router 138 then communicates with a RADIUS server 136 to authenticate and determine whether or not the user 105 controlling the connection process 155 is able to access the router 138 to establish a connection to a data storage system 160. The router 138 in step 317 can pass Windows NT domain information and Windows NT user ID information (as received within the user authentication information 124) to the RADIUS server 136 for authentication via a designated TCP/IP port number such as TCP port/socket number "1645". This in turn causes the RADIUS server 136 to verify this information with the domain server 137 and return a result. The result is then forwarded by the radius server 136 back to the router 138 in step 320.

In step 321, the data communications device 138 (i.e., the operating system within the router 138) determines if the user 105 is authenticated and authorized to access this particular data communications device 138 based on the authorization result received in step 320. If the router 138 determines in step 321 that the user is either not authenticated or is not authorized to access the processing functionality of the invention within the router 138, the processing proceeds to step 322 in which case the router 138 terminates the data communications session 180 (i.e., causes the comment session). However, if the router 138 determines in step 321 that the user is authenticated and is authorized to access the processing functionality of the invention within the router 138, processing proceeds to step 323.

In step 323, the data communications device 138 indicates to the computer system 150 that permission is granted for the connection process 155 to establish a communications session with the data storage system 160. In other words, the router 138 can send a signal using the communications session 180 back to the connection process 155 that the user 105 is authorized to proceed with a connection to the data storage system 160.

As such, in step 324, the connection process 155 negotiates with the data communications device 138 (e.g., the router) to provides second packet communications session connection information to the data communications device 138 in order to begin the process of establishing the second packet communications session 182 between a data communications device 138 and the service processor 170 within the data storage system 160. The second packet communications session connection information may include, for example, a phone number of the remotely located service processor modem 176 associated with the data storage system 160 to which a connection is to be established. This connection information they also include user authentication information 124 to allow the data storage system to authenticate access by the user 105. As an example of the operation of step 324, the connection process 155 can send the second packet communications session connection information (e.g., a dial string) to the data communications device 138, which can then acknowledge receipt of this information (the acknowledgement step not specifically shown in FIG. 7) back to the connection process 155. The acknowledgement can indicate that the modem 139 has been configured by the router 138 with the proper dialing sting information and that the modem 139 is ready to place a dial-out connection to the service processor modem 176. In response to such an acknowledgement, the connection process 155 can send a "begin dialing" string to the router 138 to cause the modem 139 (under control of the router 138) to dial the service processor modem 176.

In step 325, in response to receipt of the second packet communications session connection information from the connection process 155, the data communications device 138 initiates the second packet communications session 182 to the data storage system 160 (i.e., initiates a connection to the service processor 170 associated with the data storage system 160). In one embodiment of the invention, in step 325, the router 138 causes a particular vendor modem 139-1 through 139-W to dial a connection to a specific service processor modem 176-1 through 176-X identified by the modem phone number received within the second packet communications session connection information. The vendor modem 139 then dials the phone number of the service processor modem 176 corresponding to the service processor 170 of the data storage system 160 to which a connection is to be established.

In step 326 (top of FIG. 8), the data communications device 138 returns a status of the second packet communications session 182 back to the connection process 155 operating in the computer system 150 via the first packet communications session 180 (e.g., via the telnet session). The connection process 155 is thus kept aware of the state of initiation of the second packet communications session 182.

In step 327, when the service processor modem 176 receives the incoming request for the connection 182, the service processor modem 176 activates the service process 184 within the service processor 170 which receives the request (i.e., data from the incoming call connection) to establish a packet communications session with the data communications device 138 (i.e., the combination of the modem 139 under control the router 138).

In response to the incoming connection 182, in step 328, the service process activates (e.g., launches or otherwise wakes up) the remote access service (RAS) process 185 within the service processor 170 in order to authenticate and authorize the incoming second packet communications session connection 182.

In step 329, the RAS process 185 now operating in the service processor 170 requests user authentication information (e.g., a user name and password) from the data communications device 138 that originates the connection 182.

In step 330, in response to this request, the data communications device 138 provides the requested user authentication information (e.g., 124 as received by the router 138 from the connection process 155 in step 316) such as a user name and password to the RAS process 185 within the service processor 170.

In step 331, the RAS process 185 authenticates and authorizes the incoming second packet communications session 182 based upon the user authentication information.

Based on the authentication and authorization processing performed in step 331, in step 332, the RAS process 185 determines if the second packet communications session is authorized and authenticated on behalf of the user 105 operating the connection process 155. If the RAS process 185 determines in step 332 that the second packet communications session is not authorized or is not authenticated (i.e., does not originate from a trusted and known source such as a known router 138), the processing proceeds to step 333 wherein the RAS process 185 terminates access to the data storage system service processor 170. Alternatively, if the RAS process 185 determines that the incoming connection 182 is authorized on behalf of the user 105 and is authenticated, then the RAS process 185 returns a connection accepted message (not specifically shown in the figures) back to the data communications device 138 and processing proceeds to step 334.

In step 334, the data communications device 138 requests data storage system address information from the RAS process 185 operating in the service processor 170. The data storage system address information may be, for example, the pre-assigned data storage system IP address for the service processor 170. As noted above, according to one embodiment of the invention, the data storage system address value is a same for all service processors 170 in all customer data storage systems 160. In one embodiment, this request (received by the service processor in step 334) will cause the security client 187 in the service process 170 to trigger a reverse datagram encryption session with the predetermined gateway server 135 (coupled to the data communications device 138) in order to secure, via online encryption, all future communications that take place between the service processor 170 and the modem 139 or data communications device 138.

Next, in step 335, the RAS process 185 (using the secure communications session between the service processor 170 and the data communications device 138) returns the data storage system address information identifying an address of the data storage system 160 to the data communications device 138 (e.g., to the router). More specifically, the RAS process 185 can use a protocol such as the Dynamic Host Configuration Protocol (DHCP) to return, to the data communications device 138, the statically defined network IP address that is assigned by the vendor of the data storage system 160 for the service processor 170 upon delivery and installation of the data storage system 160 into the customer computer network 120 facility.

In step 336 (top of FIG. 9), the RAS process 185 then notifies the route service process 186 operating within the service processor 170 of the establishment of the second packet communications session 182. In one embodiment of the invention, the second packet communications session is a Point-to-Point Protocol (PPP) IP session connection existing between the vendor modem 139 and the service processor modem 176. Thus in step 336, the RAS process 185 notifies the route service process 186 of the establishment of the PPP connection 182.

In one embodiment, to provide additional security, the security client 187 on the service processor can, at this point, be activated to block out all TCP data packets except the ones that are encrypted by the predetermined gateway server 135 (i.e., operating a corresponding security server software package). This blocking of TCP packets can also reject any TCP packets that arrive at the service processor 170 that are not addressed to a specific TCP data port. This essentially establishes a secure firewall for the service processor 170 since once the connection 182 is established after step 336, only communications are allowed on a specific port and that originate from a specific gateway server 135. This prevents an unauthorized computer system on the customer computer network 120 (or on the Internet) from hi-jacking an open data communications session 182 to the service processor 170.

Preferred embodiments of the invention implement the security client 187 (and the security application 177) and a corresponding server portion (not shown in figures) of the software within the gateway server 135 (i.e., operating as a security server) using a software security encryption and authentication package called the Private Wire 2.0 Security Gateway software package manufactured by Cylink Corporation.

In step 337, the vendor modem 139 under control of the data communications device 138 forwards (184 in FIG. 3) second packet communications session state information to a network manager computer system 141. In a preferred embodiment of the invention, once the router 138 receives the statically defined network address of the service processor 170 (in step 335), the router 138 in step 337 instructs the vendor modem 139 that is handling the connection 182 to send an SNMP command trap to the network manager 141 which operates an SNMP server process within the vendor computer network 110. The SNMP command trap (e.g., 184 in FIG. 3) contains the modem identification (e.g., the modem phone number in associated IP address that the service processor modem 176 is using) and a speed (e.g., baud rate) of the service processor modem 176.

In response, in step 338, the network manager computer system 141 forwards routing information containing the data storage system address (e.g., the IP address of the service processor 170) and the modem speed of the service processor modem 176 to the connection monitor computer system 132 for forwarding on to the connection process 155 operating within the computer system 150. In this manner, in steps 337 and 338, once the vendor router 138 controlling the vendor modem 139 is aware of the completed packet communications connection 182, the router 138 instructs the vendor modem to provide this information (remote modem speed and IP address of the service processor 170) to the network manager 141 for distribution back to the connection monitor 132. Since the connection monitor 132 is responsible for updating and monitoring the state of all outbound connections to data storage systems 160, the connection monitor 132 updates the connection state within its call database (e.g., designates the particular data communications device 138 handling the connection 182 as being busy) and forwards the routing information in modem speed information to the computer system for received by the connection process 155.

In step 339, the connection process 155 operating in the computer system 150 receives the second packet communications connection state information containing the modem speed of the service processor modem 176 and the network address (e.g., IP address) of the service processor 170.

In response, in step 340, the connection process 155 adjusts the connection speed (e.g., the data transmit rate) of the first packet communications session 181 from the computer system 150 based on the second packet communications connection state information (e.g., based in the service processor modem speed).

In step 341, the connection process 155 then sends the computer system address (e.g., the IP address in use by the connection process 155) through the active packet communications sessions 180 and 182 to the route service process 186 operating within the service processor 170 in the data storage system 160. In this manner, when the connection process 155 learns of the successful status of the connection 182 between the data communications device 138 in the service processor 170 (via the connection monitor status received in step 339), the connection process 155 can provide the service processor 170 with its address so that any applications operating on the service process 170 (e.g., the service process 184) can communicate (e.g., using TCP/IP) back to the connection process 155.

In step 342, the route service process 186 operating within the service processor 170 in the data storage system 160 adds a route path to the computer system 150 through the data communications device 138 (i.e., through the router) based on the computer system address received in response to the connection process processing of step 341. In other words, the route service process 186 adds the connection path through the router 138 back to the computer system 150 into a route table.

Finally, in step 343, the route service process 186 operating within the service processor 170 acknowledges receipt of the computer system address over the connection 182, thus enabling packet communications session connectivity between the computer system 150 and the service processor 170 operating in the data storage system 160.

Figure 9:
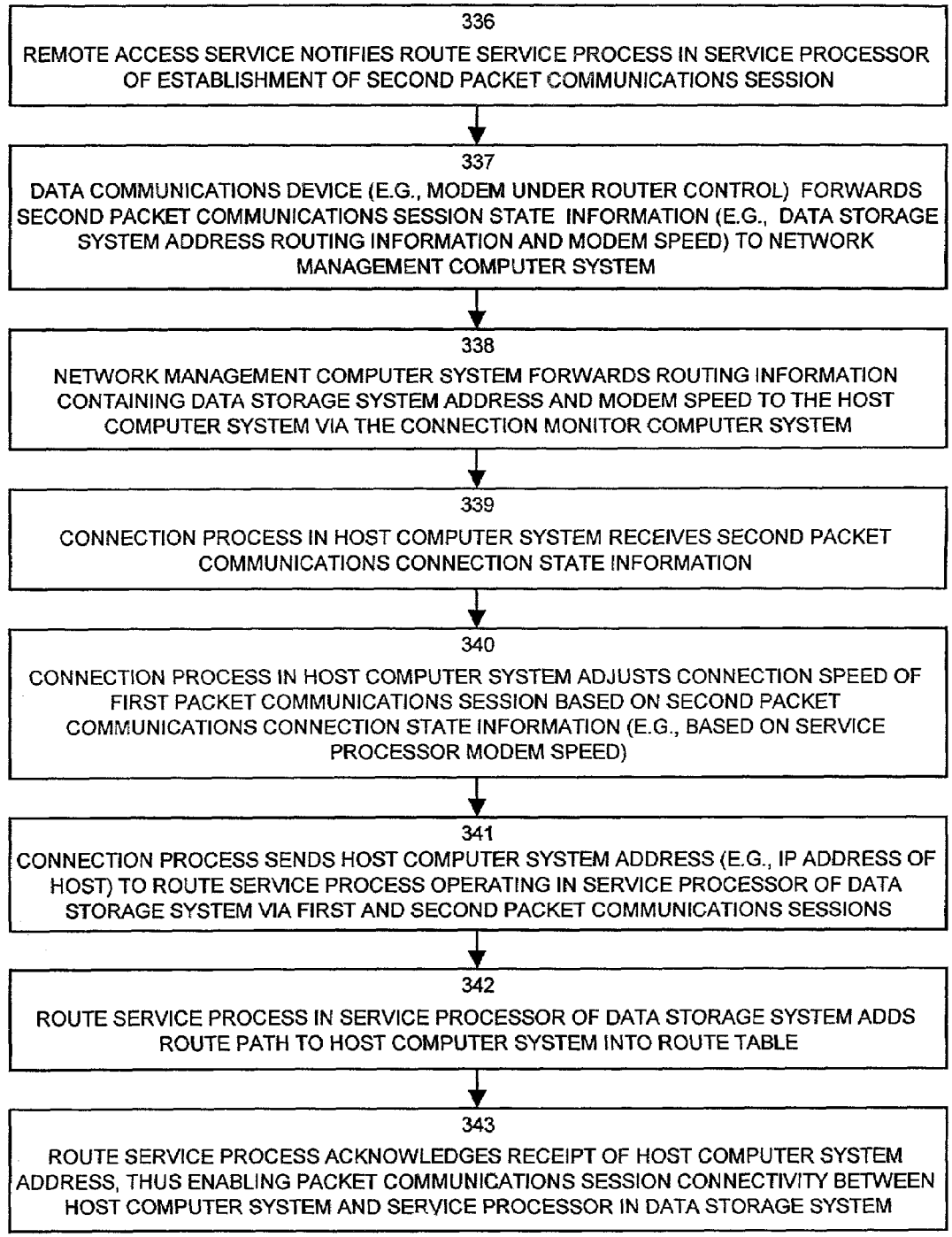

While not specifically shown in the flow chart in FIG. 9, at this point, the service process 184 can activate the security process 187 to engage in a public key exchange process with the gateway server 135 in order to provide a secure encrypted VPN connection over the packet communications session 182, such that all communications between the service processor 170 and the vendor modem 139 and data communications device 138 are secured and encrypted.

According to the aforementioned embodiments, the operations allow the computer system 150 to initiate and establish a packet-based communications session to a service processor 170 within a data storage system 160. This allows applications to perform package communications provided by the Internet Protocol and TCP/IP or UDP.

Those skilled in the art will understand that there can be many variations made to the operations and mechanisms explained herein while still achieving the same objectives of the invention.

For example, in an alternative configuration, the connection 182 placed between the data communications device 138 and the service processor 170 need not be limited to a modem or dial-up type connection. Rather, any type of connection mechanisms or mediums that support packet-based communications such as communications sessions that use the Internet Protocol are contemplated has been within the scope of the invention. As a specific example, the service processor 170 within a data storage system 160 may be equipped with an Ethernet adapter card (e.g., the Network Interface Card or NIC) to allow high-speed Ethernet communications to take place from the service processor 170 over a customer computer network 120 back to the data communications device 138 on the vendor computer network 110.

Those skilled in the art will appreciate that other variations are also possible. For example, the flow charts of processing steps as explained above described processing events in certain sequences. It is to be understood that modifications to the order of these processing steps is possible while still achieving the objectives of the system of the invention. In addition, it is to be understood that the term "packet communications session" as used herein is not intended to be limited to a TCP/IP communications session. Rather, this term is meant to be general in nature to include any type of networked communications session that can take place over a computer or data communications network between two or more computerized devices. Examples of other types of packet communications sessions include ATM connections, frame-relay connections, SONET connections, TCP/IPX connections, and the like. In other words, embodiments of the invention are not limited to using the TCP/IP suite of protocols, and any communications protocols that can support the techniques explained herein are intended to be included in the term "packet communications session." Such variations are intended to be covered by the scope of this invention. As such, the foregoing description of embodiments of the invention are not intended to be limiting. Rather, any limitations to embodiments of the invention are presented in the following claims.

What is claimed is:

1. In a computer system, a method comprising:
receiving, from a data storage system, a request to establish a communications session with the data storage system;
providing data storage system search criteria including user authentication information to a connection monitor computer system to produce a set of data storage system identities that meet the data storage system search criteria;
receiving a set of data storage system identities including identities of data storage systems to which a user, identified by the user authentication information, is allowed to establish a packet communications session;
allowing the user to select at least one data storage system identity from the set of data storage system identities;
establishing a first packet communications session from the computer system to a data communications device capable of communicating with the data storage system;
establishing a second packet communications session from the data communications device to a service processor associated with the data storage system; and
performing packet communications between the computer system and the service processor associated with the data storage system using the first and second packet communications sessions.

2. The method of claim 1 wherein the step of receiving a request to establish a communications session with a data storage system comprises:
receiving user authentication information for a user of the computer system;
authenticating an identity of the user based on the user authentication information.

3. The method of claim 2 wherein:
the request to establish a communications session with a data storage system includes the identity of the data storage system to which a communications session is to be established; and
wherein the identity specifies at least one of:
i) a phone number of a service processor modem associated with the data storage system;
ii) a serial number of the data storage system; and
iii) customer information related to a customer operating the data storage system.

4. The method of claim 1 wherein:
the data storage system search criteria is received from at least one of:
i) a user of the computer system;
ii) a service ticket identifying a data storage system.

5. The method of claim 1 wherein establishing a first packet communications session comprises:
obtaining connection information for the data communications device, wherein the obtaining comprises:
initiating the first packet communications session from the computer system to the data communications using the connection information for the data communications device;
providing, to the data communications device, the user authentication information such that the data communication device can determine if a user of the computer system is authorized to establish the first packet communications session; and
providing, to a connection monitor computer system, a request for an address of a data communications device, the request including data communications device selection criteria allowing the connection monitor computer system to select and return an address of an available data communications device that is authorized to establish the second packet communications session to the data storage system; and
receiving the address of the data communications device selected by the connection monitor computer system.

6. The method of claim 5 wherein the request for an address of the data communications device includes at least one of:
i) a portion of the user authentication information;
ii) customer information concerning a customer operating the data storage system; and
iii) connection information associated with the data storage system; and
wherein the connection monitor computer system compares the request for an address against user and customer data to determine what data storage systems a user providing the request is allowed to access.

7. The method of claim 5 wherein receiving a request to initiate a communications session with the data storage system further comprises:
receiving a service ticket from the data storage system; and
analyzing the service ticket to determine an identity of the data storage system to which a packet communications session is to be established from the computer system.

8. The method of claim 1 wherein:
the step of initiating the first packet communications session establishes an internet protocol communications session between the computer system and the data communications device; and
wherein the step of providing, to the data communications device, first packet communications session authentication information passes user authentication information from the computer system to the data communications device to allow the data communications device to authorize the internet protocol communications session.

9. The method of claim 8 wherein the step of providing, to the data communications device, first packet communications session authentication information causes the data communications device to communicate with a user account computer system to verify if the user of the computer system identified in the user authentication information is authorized to cause the data communications device to establish the first and second packet communications sessions from the computer system, through the data communications device, to the data storage system.

10. The method of claim 1 wherein the step of establishing a second packet communications session from the data communications device to the data storage system comprises:
providing, to the data communications device, second packet communications session connection information allowing the data communications device to initiate the second packet communications session from the data communications device to the data storage system; and
receiving second packet communications session state information indicating a state of the second packet communication session between the data communications device and the data storage system.

11. The method of claim 10 wherein:
the second packet communications session connection information includes data storage system connection information associated with the data storage system and user authentication information of the user of the computer system; and
wherein the step of providing the second packet communications session connection information to the data communications device causes the data communications device to perform the steps of:

initiating the second packet communications session from the data communications device to the data storage system using the data storage system connection information;

providing the user authentication information to a remote access server associated with the data storage system to allow the remote access server to authorize the establishment of the second packet communications session from the data communications device to the data storage system;

receiving data storage system address information at the data communications device identifying an address of the data storage system to allow the data communications device to establish the second packet communications session; and forwarding second packet communications session state information to the computer system from the data communications device to allow the computer system to perform packet communications with the computer system and data storage system using the first and second packet communications sessions.

12. The method of claim 11 wherein the data storage system address information is a pre-configured network address assigned to the service processor associated with the data storage system.

13. The method of claim 11 wherein:
the second packet communications session connection information includes data storage system connection information including a phone number of a service processor modem associated with the service processor associated with the data storage system; and wherein the step of initiating the second packet communications session from the data communications device to the data storage system causes the data communications device to instruct a modem to dial the phone number of a service processor modem in order to establish a dial up connection to the data storage system from the data communications device.

14. The method of claim 11 wherein:
the second packet communications session state information includes the data storage system address information and includes data storage system connection bandwidth information; and wherein the step of forwarding second packet communications session state information to the computer system from the data communications device causes the data communications device to perform the step of:

forwarding the second packet communications session state information to a network manager computer system which receives the second packet communications session state information and forwards routing information to the computer system so that the computer system can perform packet communications with the data storage system.

15. The method of claim 11 wherein performing packet communications between the computer system and the service processor associated with the data storage system comprises:

receiving the second packet communications session state information in response to the step of forwarding second packet communication session state information to the computer system from the data communication device;

adjusting connection bandwidth associated with the first packet communications session to match connection bandwidth associated with the second packet communications session;

providing computer system address information to the data storage system so that the data storage system can establish a route to the computer system; and using the first packet communications session between the computer system and the data communications device and the second packet communications session between the data communications device and the service processor associated with the data storage system to perform packet communications between the computer system and the service processor associated with the data storage system.

16. The method of claim 1 further comprising activating a security client on said service processor to block out TCP data packets that have not been encrypted by a predetermined gateway server.

17. The method of claim 1 wherein said data storage system comprises a plurality of data storage devices which collectively operate under the control of at least one software driven microprocessor to access data in accordance with data access requests.

18. In a processor in a data storage system, a method for establishing a packet communications session with a computer system, the method comprising:

sending, to the computer system, a request to establish a communications session with the data storage system, the request including user authentication information needed to establish the communications session;

receiving a request to initiate a packet communications session, the request to initiate a packet communications session including the user authentication information;

providing data storage system search criteria including user authentication information to a connection monitor computer system to produce a set of data storage system identities that meet the data storage system search criteria;

receiving a set of data storage system identities including identities of data storage systems to which a user, identified by the user authentication information, is allowed to establish a packet communications session;

allowing the user to select at least one data storage system identity from the set of data storage system identities;

providing data storage system address information to an initiator of the request;

receiving computer system address information to allow a processor in the data storage system to perform packet communications with the computer system; and establishing a packet communications session with the computer system based on the computer system address information.

19. The method of claim 18, comprising:
authorizing, based on the user authentication information, the establishment of the packet communications session with the computer system.

20. The method of claim 19 wherein the processor is a service processor in the data storage system and the data storage system address information is a pre-configured network address assigned to the service processor associated with the data storage system by a vendor of the data storage system.

21. The method of claim 18 wherein:
the request to initiate a packet communications session is sent from a data communications device interconnected with the computer system; and wherein the step of providing data storage system address information provides a network address of the processor in the data storage system to the data communications device for receipt by the computer system to allow the computer system to perform packet communications to the data storage system.

22. The method of claim 18 wherein the step of establishing a packet communications session with the computer system establishes route information within the data storage system based on the computer system address information to allow the processor to perform packet communications with the computer system.

23. A computer program product having a computer-readable medium including computer program logic instructions encoded thereon that when performed on a computer processor in a computer system, causes the processor to perform the operations of:

receiving, from a data storage system, a request to establish a communications session with the data storage system, the request including user authentication information needed to establish the communications session;

providing data storage system search criteria including user authentication information to a connection monitor computer system to produce a set of data storage system identities that meet the data storage system search criteria;

receiving a set of data storage system identities including identities of data storage systems to which a user, identified by the user authentication information, is allowed to establish a packet communications session;

establishing a first packet communications session from the computer system to a data communications device capable of communicating with the data storage system;

establishing a second packet communications session from the data communications device to a service processor associated with the data storage system; and performing packet communications between the computer system and the service processor associated with the data storage system using the first and second packet communications sessions.

24. The computer program product of claim 23 wherein the computer program logic further includes instructions that, when performed on the processor, cause the processor to perform the operations of:

obtaining connection information for the data communications device that is capable of communicating with the data storage system;

initiating the first packet communications session from the computer system to the data communications device using the connection information for the data communications device;

providing, to the data communications device, the user authentication information such that the data communications device c an determine if a user of the computer system is authorized to establish the first packet communications session; and if the user of the computer system is authorized to establish the first packet communications session, allowing the computer system to perform the step of establishing a second packet communications session from the data communications device to the data storage system; and if the user of the computer system is not authorized to establish the first packet first packet communications session, denying the ability of the computer system to perform the step of establishing a second packet communications session from the data communications device to the data storage system.

25. The computer program product of claim 23 wherein the computer program logic further includes instructions that, when performed on the processor, cause the processor to perform the operations of:

providing, to the data communications device, second packet communications session connection information allowing the data communications device to initiate the second packet communications session from the data communications device to the data storage system; and receiving second packet communications session state information indicating a state of the second packet communication session between the data communications device and the data storage system.

26. The computer program product of claim 25 wherein the data storage system address information is a pre-configured network address assigned to the service processor associated with the data storage system.

27. The computer program product of claim 23 wherein the computer program logic further includes instructions that, when performed on the processor, causes the processor to perform the operations of:

receiving the second packet communications session state information in response to the step of forwarding second packet communication session state information to the computer system from the data communication device;

adjusting connection bandwidth associated with the first packet communications session to match connection bandwidth associated with the second packet communications session;

providing computer system address information to the data storage system so that the data storage system can establish a route to the computer system; and using the first packet communications session between the computer system and the data communications device and the second packet communications session between the data communications device and the data storage system to perform packet communications between the computer system and the data storage system.

28. The computer program product of claim 23 wherein said data storage system comprises a plurality of data storage devices which collectively operate under the control of at least one software driven microprocessor to access data in accordance with data access requests.

29. A computer program product having a computer-readable medium including computer program logic encoded thereon that when performed on a computer processor in a data storage system, the computer program logic causes the processor to perform the operations of:

sending, to a computer system, a request to establish a communications session with the data storage system, the request including user authentication information needed to establish the communications session;

providing data storage system search criteria including user authentication information to a connection monitor computer system to produce a set of data storage system identities that meet the data storage system search criteria;

receiving a set of data storage system identities including identities of data storage systems to which a user, identified by the user authentication information, is allowed to establish a packet communications session;

receiving a request to initiate a packet communications session, the request to initiate a packet communications session including the user authentication information;

providing data storage system address information to an initiator of the request;

receiving computer system address information to allow a processor in the data storage system to perform packet communications with the computer system; and establishing a packet communications session with the computer system based on the computer system address information.

30. The computer program product of claim 29 wherein the processor is a service processor in the data storage system and the data storage system address information is a pre-configured network address assigned to the service processor associated with the data storage system by a vendor of the data storage system.

* * * * *